(12) United States Patent
Niergarth et al.

(10) Patent No.: US 11,945,600 B2
(45) Date of Patent: *Apr. 2, 2024

(54) FUEL DELIVERY SYSTEM HAVING A FUEL OXYGEN REDUCTION UNIT

(71) Applicant: General Electric Company, Schenectady, NY (US)

(72) Inventors: Daniel Alan Niergarth, Norwood, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,262

(22) Filed: Aug. 19, 2022

(65) Prior Publication Data

US 2022/0402625 A1    Dec. 22, 2022

Related U.S. Application Data

(63) Continuation of application No. 16/864,441, filed on May 1, 2020, now Pat. No. 11,420,763, which is a
(Continued)

(51) Int. Cl.
*B64D 37/34* (2006.01)
*B64D 37/10* (2006.01)
(Continued)

(52) U.S. Cl.
CPC ............. *B64D 37/34* (2013.01); *B64D 37/10* (2013.01); *B64D 37/32* (2013.01); *F02C 7/22* (2013.01); *F23K 5/04* (2013.01); *F23K 5/08* (2013.01)

(58) Field of Classification Search
CPC .... B01D 3/343; B01D 19/00; B01D 19/0005; B01D 19/0063; B01D 2257/104; B64D 37/10; B64D 37/32; B64D 37/34; B64D 2013/0677; B64D 2013/0681; F02C 7/22; F02C 7/224; F02C 7/236; F23K 5/04;
(Continued)

(56) References Cited

U.S. PATENT DOCUMENTS 2,582,842 A    1/1952  Messinger
2,720,313 A   10/1955  Pattison
(Continued)

FOREIGN PATENT DOCUMENTS

CN    107867404 A     4/2018
EP      2003311 A2   12/2008
(Continued)

OTHER PUBLICATIONS

Landfill, Sewage, Biogas, Coal, Seam & Mines Gas Separation/Filtration, Kelburn Engineering—LandfillGas and Air Separation, 3 pages. www.kelburneng.com/landfill-gas-bio-gas-sewer.php.

*Primary Examiner* — Scott J Walthour
(74) *Attorney, Agent, or Firm* — Dority & Manning, P.A.

(57) ABSTRACT

A fuel system is provided for an aircraft having a fuel source. The fuel system includes a fuel oxygen reduction unit defining a liquid fuel supply path, a stripping gas supply path, a liquid fuel outlet path, and a stripping gas return path, wherein the stripping gas return path is in airflow communication with the fuel source.

16 Claims, 10 Drawing Sheets

Related U.S. Application Data continuation-in-part of application No. 16/179,077, filed on Nov. 2, 2018, now Pat. No. 11,148,824.

(51) Int. Cl.
- *B64D 37/32* (2006.01)
- *F02C 7/22* (2006.01)
- *F23K 5/04* (2006.01)
- *F23K 5/08* (2006.01)

(58) Field of Classification Search
CPC ..... F23K 5/08; F23K 5/10; F23K 5/18; F23K 2300/103; F23K 2300/204; F23K 2900/05082
See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 11,148,824 B2 * | 10/2021 | Niergarth ........... B01D 19/0005 |
| 2008/0128048 A1 | 6/2008 | Johnson et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0087807 A1 | 4/2012 | Buchwald |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |

(56) References Cited

U.S. PATENT DOCUMENTS

| | | |
|---|---|---|
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2018/0354644 A1 | 12/2018 | Massie et al. |
| 2019/0153952 A1 | 5/2019 | Niergarth et al. |
| 2019/0153953 A1 | 5/2019 | Niergarth et al. |
| 2020/0086239 A1 | 3/2020 | Cordatos et al. |

FOREIGN PATENT DOCUMENTS

| | | |
|---|---|---|
| EP | 3018304 A1 | 5/2016 |
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

\* cited by examiner

FUEL DELIVERY SYSTEM HAVING A FUEL OXYGEN REDUCTION UNIT

CROSS-REFERENCE TO RELATED APPLICATIONS

This application is a continuation of and claims priority to U.S. application Ser. No. 16/864,441, filed May 1, 2020, which is a continuation-in-part application of U.S. application Ser. No. 16/179,077, filed Nov. 2, 2018, now issued as U.S. Pat. No. 11,148,824, the contents of each of which are incorporated herein in their entirety by reference.

FIELD

The present subject matter relates generally to a fuel oxygen reduction unit for a fuel delivery system of a vehicle.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel. However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen reduction systems have been proposed for such a purpose. These fuel oxygen reduction systems are generally positioned at the engine to reduce an oxygen content of the fuel provided to the engine.

In addition, certain fuel delivery systems for aircraft including gas turbine engines generally also include a system for removing an oxygen content of an air within an ullage of a fuel tank (e.g., the fuel tank from which fuel is provided to the gas turbine engines). Reducing an oxygen content of such gasses may reduce a risk of fire within the fuel tank. The system for removing an oxygen content of the air/gas in the ullage generally operate differently than the fuel oxygen reduction system (for reducing an oxygen content of a liquid fuel).

The inventors of the present disclosure have found that operating each of these various systems may be inefficient. Accordingly, a system for reducing both an oxygen content of a liquid fuel provided to each individual aircraft engine and of gasses within an ullage of the fuel tank would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel system is provided for an aircraft. The fuel system includes a fuel source; and a fuel oxygen reduction unit defining a liquid fuel supply path, a stripping gas supply path, a liquid fuel outlet path, and a stripping gas return path, wherein the stripping gas return path is in fluid communication, and optionally in selective fluid communication, with the fuel source.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
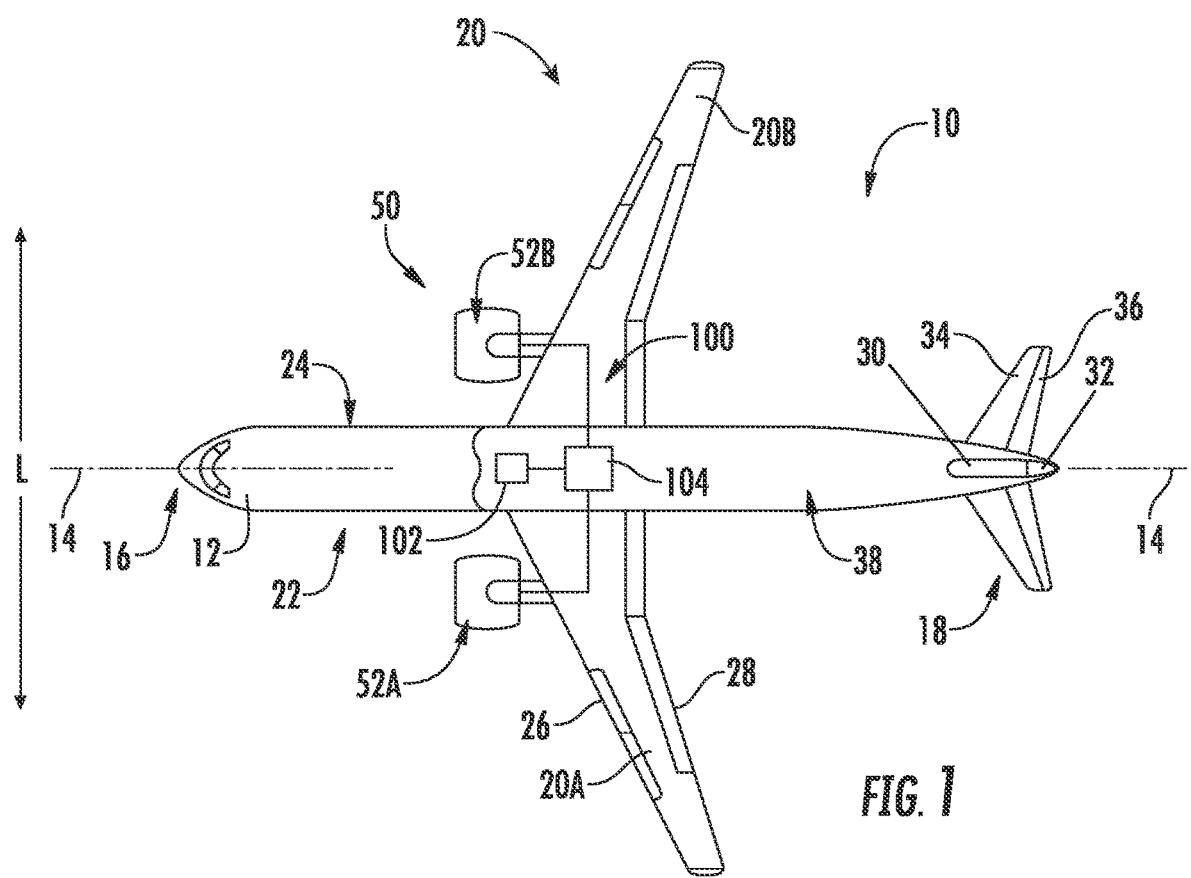
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present invention. The aircraft 10 defines a longitudinal centerline 14 that extends therethrough, a vertical direction (not shown), a lateral direction L, a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. A first wing 20A of such wings 20 extends laterally outwardly with respect to the longitudinal centerline 14 from a port side 22 of the fuselage 12 and a second wing 20B of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction or horizontal/lateral direction L. Further, the aircraft 10 may include any other suitable configuration of wings 20 (e.g., a canard configuration, blended wing configuration, etc.), fuselage 12, etc.

The exemplary aircraft 10 of FIG. 1 includes a propulsion system 50, herein referred to as "system 50". The exemplary system 50 includes one or more aircraft engines 52. For example, the embodiment depicted includes a plurality of aircraft engines 52, each configured to be mounted to the aircraft 10, such as to one of the pair of wings 20. More specifically, for the embodiment depicted, the aircraft engines 52 are configured as gas turbine engines, such as turbofan jet engines, attached to and suspended beneath the wings 20 in an under-wing configuration (it being appreciated that in other embodiments, the aircraft engines 52 may be any other suitable, at least partially combustion engines). For example, the aircraft engines 52 include a first aircraft engine 52A and a second aircraft engine 52B. The first aircraft engine 52A is configured to be mounted to the first wing 20A of the aircraft 10, and the second aircraft engine 52 is configured to be mounted to the second wing 20B of the aircraft 10 (i.e., on an opposite side of the aircraft 10). It will be appreciated that although only two aircraft engines 52 are depicted in FIG. 1, in other embodiments, the propulsion system 50 of the aircraft 10 may have any other suitable number and type of aircraft engines 52, mounted at any other suitable location (e.g., mounted to the wings, to the fuselage at the aft end of the aircraft 10, to one or stabilizers, etc.).

As is further depicted in FIG. 1, the aircraft 10 includes a fuel delivery system 100. More specifically, the fuel delivery system 100 is generally configured to supply the aircraft engines 52, i.e., the first aircraft engine 52A and the second aircraft engine 52B for the embodiment of FIG. 1, with an amount of fuel during operation. More specifically, for the embodiment shown, the fuel delivery system 100 is configured to provide the aircraft engines 52 with a relatively low oxygen content fuel during operation, as will be explained in greater detail below. In such a manner, it will be appreciated that the fuel delivery system 100 generally includes a fuel source 102 (e.g., a fuel tank) and a fuel oxygen reduction unit 104. The fuel oxygen reduction unit 104 is configured to receive fuel from fuel source 102, reduce an oxygen content of such fuel, and provide such fuel to the aircraft engines 52. Moreover, as will be explained in more detail with reference to FIGS. 2 and 3, below, the fuel oxygen reduction system 104 is further configured to reduce an oxygen content of an air within an ullage of the fuel source 102. Notably, as used herein, the term "fuel oxygen reduction unit" generally means a device capable of reducing a free oxygen content of the fuel, such as a fuel oxygen conversion unit, a fuel oxygen extraction unit, etc.

It will be appreciated, however, that in other exemplary embodiments, the aircraft 10 and/or engines 52 may have any other suitable configuration. For example, in other embodiments, the aircraft 10 may have other wing and/or fuselage designs, engine count and/or configuration or positioning, etc. Further, in other embodiments, the aircraft 10 may be, e.g., a vertical takeoff and landing aircraft, such as a helicopter. Other embodiments are contemplated as well.

Figure 2:
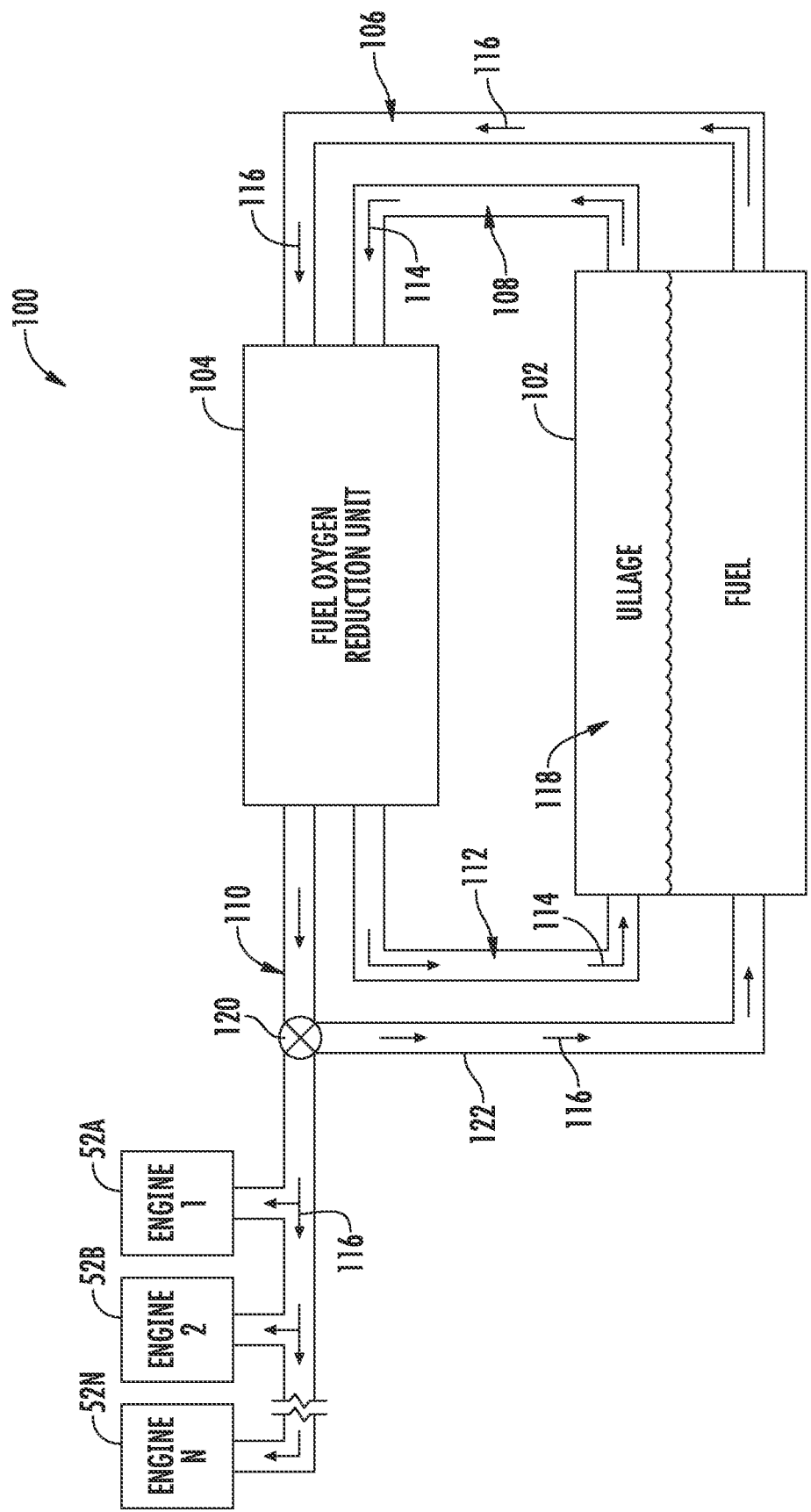
FIG. 2 is a schematic view of a fuel delivery system in accordance with an exemplary embodiment of the present disclosure.

More specifically, referring now briefly to FIG. 2, a schematic view of a fuel delivery system 100 as may be incorporated into the aircraft 10 of FIG. 1 is provided. As is depicted, the fuel delivery system 100 generally includes a fuel source 102 and a fuel oxygen reduction unit 104, and defines a plurality of flowpaths. Specifically, for the embodiment shown, the fuel delivery system 100, and the fuel oxygen reduction unit 104, generally defines a liquid fuel supply path 106, a stripping gas supply path 108, a liquid fuel outlet path 110, and a stripping gas return path 112. The stripping gas supply path 108 and stripping gas return path 112 are each in fluid communication, and optionally in selective fluid communication, with the fuel source 102 for receiving a flow of gas 114 from the fuel source 102 (which, as will be explained below, is a stripping gas) and providing the flow of gas 114 back to the fuel source 102. Similarly, for the embodiment shown, the liquid fuel supply path 106 is in fluid communication with the fuel source 102 for receiving a flow of liquid fuel 116 therefrom. Notably, for the embodiment shown, the fuel source 102 is configured as a fuel tank. Within the fuel tank, the fuel source 102 includes an amount of liquid fuel and an amount of vapor/air/gas. The space within the tank containing the vapor/air/gas (e.g., within the tank and above the fuel) may generally be referred to as the ullage 118. During operation, it will be appreciated that the fuel oxygen reduction unit 104 is generally configured to: receive the flow of air/gas 114 from the ullage 118 of the fuel source 102 and the flow of liquid fuel 116 from the fuel source 102, to reduce an oxygen content of each, to provide the relatively low oxygen content flow of gas 114 back to the ullage 118, and to provide the relatively low oxygen content flow of liquid fuel 116 to the aircraft engines 52. By reducing an oxygen content of the vapor/air/gas in the ullage 118, a risk of flame-ups or fires within the tank in case of a spark may be reduced. Further, by reducing an oxygen content of the liquid fuel 116 provided to the engines 52, an increased amount of heat may be added thereto with reduced risk of coking (allowing for increased efficiencies in the combustion process and providing an effective heat sink).

Specifically, for the embodiment shown, the fuel delivery system 100 is configured to provide fuel 116 having a relatively low oxygen content from the fuel oxygen reduction unit 104 to each of the plurality of aircraft engines 52, which for the embodiment shown includes a first aircraft engine 52A, a second aircraft engine 52B, up to an "Nth" aircraft engine 52N (e.g., three, four, five, six, etc. aircraft engines 52). In such a manner, it will be appreciated that the fuel deoxygenation unit 104 is fluidly coupled to each of the plurality of aircraft engines 52 through the liquid fuel outlet path 110, and is therefore configured to provide relatively low oxygen content liquid fuel 116 to each of such engines 52.

A fuel delivery system 100 in accordance with such an exemplary embodiment, as will be discussed in greater detail below, may be capable of maintaining a relatively low oxygen content air within the ullage 118, while also providing relatively low oxygen content fuel to a plurality of aircraft engines 52.

Notably, for the embodiment shown fuel delivery system 100 further includes a return valve 120 and a return line 122 for returning an amount of relatively low oxygen content liquid fuel to the fuel source 102 in the event such fuel is not required by the aircraft engines 52. However, in other embodiments, the system 100 may be configured without the return valve 120 and return line 122 and may instead regulate the flow of liquid fuel 116 in other suitable manners.

Figure 3:
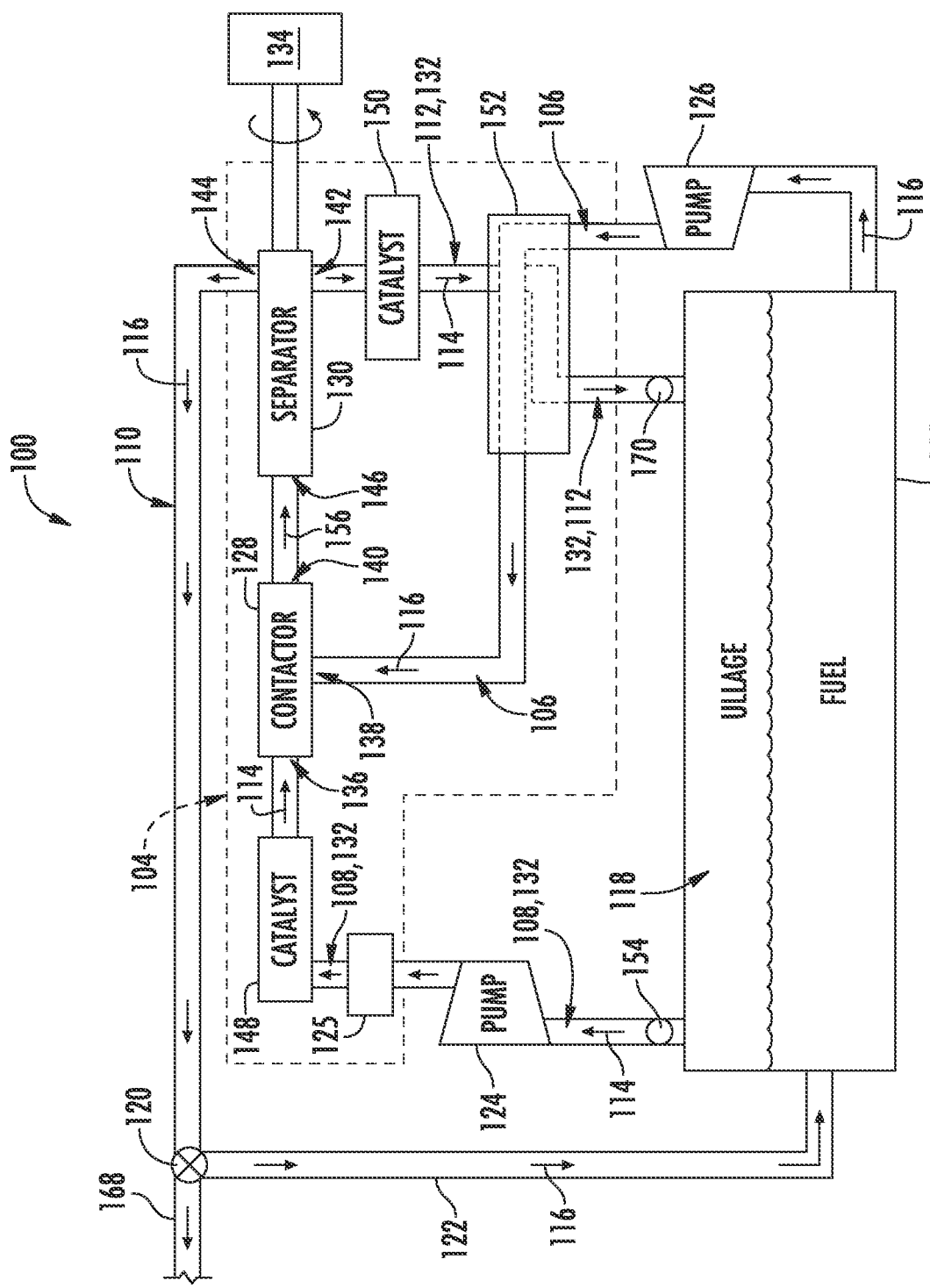
FIG. 3 is a close-up, schematic view of a section of a fuel delivery system in accordance with an exemplary embodiment of the present disclosure.

Referring now to FIG. 3, a more detailed, schematic drawing of a fuel delivery system 100 for an aircraft 10 in accordance with an exemplary embodiment of the present disclosure is provided. In at least certain exemplary embodiments, the exemplary fuel delivery system 100 depicted in FIG. 3 may be incorporated into, e.g., the exemplary aircraft 10 described above with reference to FIG. 1, and/or may be configured in a similar manner to the exemplary fuel delivery system 100 of FIG. 2. As such, it will be appreciated that the fuel delivery system 100 generally includes a fuel source 102 and a fuel oxygen reduction unit 104, and the fuel delivery system 100 and fuel oxygen reduction unit 104 generally defines a liquid fuel supply path 106, a stripping gas supply path 108, a liquid fuel outlet path 110, and a stripping gas return path 112. The stripping gas return path 112 and the stripping gas supply path 108 are each in airflow communication with the fuel source 102. Further, for the embodiment depicted, the liquid fuel supply path 106 of the fuel oxygen reduction unit 104 is in fluid communication with fuel source 102. In such a manner, it will be appreciated that the fuel oxygen reduction unit 104 is generally configured to receive a flow of liquid fuel 116 from the fuel source 102 and is further configured to receive a flow of gas 114 (referred to herein as "stripping gas") also from the fuel source 102. Further, as will be described in detail below, the fuel oxygen reduction unit 104 is configured to return the stripping gas 114 to the fuel source 102. As noted with reference to the embodiment above, for the embodiment of FIG. 3, the fuel source 102 generally includes an amount of liquid fuel 116 and defines an ullage 118 above the liquid fuel 116. The gas received through the stripping gas supply path 108 is received from the ullage 118, and the gas provided to the fuel source 102 through the stripping gas return path 112 is provided to the ullage 118.

In order to assist with the flow of stripping gas 114 from the fuel source 102, or rather from the ullage 118 of the fuel source 102, the fuel delivery system 100 includes an ullage pump 124 in airflow communication with the ullage 118 of the fuel source 102 and the stripping gas supply path 108 of the fuel oxygen reduction unit 104. Similarly, in order to assist with the flow of liquid fuel 116 from the fuel source 102, the fuel delivery system 100 includes a fuel pump 126 in fluid communication with the fuel source 102 and the liquid fuel supply path 106.

Further, for the embodiment depicted, the fuel oxygen reduction unit 104 generally includes a contactor 128 and a fuel gas separator 130. Additionally, the exemplary fuel oxygen reduction unit 104 defines a stripping gas flowpath 132. For the embodiment shown, the stripping gas flowpath 132 includes the stripping gas supply path 108 and the stripping gas return path 112. As such, the stripping gas flowpath 132 generally extends from a location upstream of the contactor 128, through the contactor 128 and separator 130, to a location downstream of the separator 130. In certain exemplary embodiments, the stripping gas flowpath 132 may be formed of any combination of one or more conduits, tubes, pipes, etc., as well as structures of components within the stripping gas flowpath 132.

It will be appreciated that the term "stripping gas" is used herein as a term of convenience to refer to a gas generally capable of performing the functions described herein. Specifically, for the embodiment depicted, the stripping gas 114 is substantially comprised of gas from the ullage 118 of the fuel source 102. As such, the stripping gas 114 may be made up primarily of atmospheric air. Additionally, or alternatively, the stripping gas 114 may be any other suitable gas, such as an inert gas or a substantially inert gas.

Referring still to the embodiment depicted, the fuel gas separator 130 is a mechanically-driven fuel gas separator 130 mechanically coupled to, and driven by, a power source 134. For the embodiment of FIG. 3, the power source 134 driving the fuel gas separator 130 may be any suitable power source, such as an electric motor, a hydraulic motor, a pneumatic motor, a combustion engine, a power source shared with other components, etc. However, in other embodiments, the fuel gas separator 130 and the power source 134 driving the fuel gas separator 130 may be configured in any other suitable manner.

As will be explained in more detail below, for the embodiment of FIG. 3, the contactor 128 generally defines a gas inlet 136, a liquid fuel inlet 138, and a fuel/gas mixture outlet 140. Further, the fuel gas separator 130 generally defines a gas outlet 142, a liquid fuel outlet 144, and a fuel/gas mixture inlet 146. The gas inlet 136 of the contactor 128 is in airflow communication with the stripping gas supply path 108, the liquid fuel inlet 138 of the contactor 128 is fluidly connected to the liquid fuel supply path 106, and the fuel/gas mixture outlet 140 of the contactor 128 is fluidly coupled to the inlet 146 of the fuel gas separator 130. Further, the gas outlet 142 of the separator 130 is in airflow communication with the stripping gas return path 112 of the stripping gas flowpath 132, and the liquid fuel outlet 144 of the separator 130 is fluidly connected with the liquid fuel outlet path 110.

Moreover, for the exemplary fuel oxygen reduction unit 104 depicted in FIG. 3, the fuel oxygen reduction unit 104 further includes a first catalyst 148 and a second catalyst 150. For the embodiment shown, the first catalyst 148 and the second catalyst 150 are each arranged in series flow along the stripping gas flowpath 132. More specifically, for the embodiment shown, the first catalyst 148 is positioned within the stripping gas flowpath 132 at a location upstream of the contactor 128 (and downstream of the ullage 118), and the second catalyst 150 is positioned within the stripping gas flowpath 132 at a location downstream of the separator 130 (and upstream of the ullage 118). It will be appreciated, however, that in other embodiments, listed components may be provided in any suitable flow order, not all listed components may be included (see, e.g., FIG. 5), or additional components not listed may be included.

Further, the exemplary fuel oxygen reduction unit 104 depicted in FIG. 3, additionally includes a heat exchanger 152. For the embodiment shown, the heat exchanger 152 is positioned in thermal communication with, and more specifically, in airflow communication with, the stripping gas flowpath 132 at a location downstream of the second catalyst 150, and upstream of the ullage 118. Further, for the embodiment shown the heat exchanger 152 is in thermal communication, or more specifically flow communication, with the liquid fuel supply path 106, such that the liquid fuel supply path 106, or rather, a flow of liquid fuel 116 therethrough, may accept heat from the flow of stripping gas 114 through the stripping gas return path 112 downstream of the second catalyst 150. Such may therefore reduce a temperature of the gas flowing into the ullage 118 of the fuel source 102.

During typical operations, stripping gas 114 is urged through the stripping gas supply flowpath 108 by the ullage pump 124, and across an upstream flame arrester 154. Briefly, the upstream flame arrester 154 may be configured to prevent a flame from crossing into the fuel source 102 from the stripping gas supply path 108, or vice versa. For the embodiment shown, the stripping gas 114 flows from the ullage pump 124 through a pre-heater 125 and into the first catalyst 148. The pre-heater 125 may be an electrical resistance heater, a heat exchanger thermally coupled with another system (not shown), or any other suitable heat source for increasing a temperature of the stripping gas 114. The pre-heater 125 may be configured to increase a temperature of the stripping gas 114 to, or above, an activation temperature of the first catalyst 148 (e.g., a minimum light off temperature of the first catalyst 148 that allows the first catalyst 148 to operate properly). Although the exemplary pre-heater 125 is depicted as a separate component from the first catalyst 148, in other embodiments, the pre-heater 125 may be integrated into the first catalyst 148.

Further, within the first catalyst 148, the oxygen content of the stripping gas 114 is reduced. More specifically, within the first catalyst 148, the potentially relatively oxygen-rich stripping gas 114 may be reacted to reduce the oxygen content thereof. It will be appreciated, however, that first catalyst 148 may be configured in any suitable manner to reduce an oxygen content of the stripping gas 114. For example, in certain embodiments, the first catalyst 148 may be configured to react the fuel-vapor rich stripping gas 114 with elements inside the first catalyst 148 to provide a relatively oxygen-free stripping gas 114 upon exit. For example, the first catalyst 148 may include geometries of catalytic components through which the relatively oxygen-rich stripping gas 114 flows to reduce an oxygen content thereof. Such reaction may utilize at least in part a fuel content of the stripping gas 114 present by virtue of the stripping gas 114 originating in the fuel source 102 (i.e., being in contact with the fuel therein). In one or more of these configurations, a byproduct may be produced, such as water. The water, if produced, may be in vapor form and may continue as part of the stripping gas 114. Alternatively, the water or other byproduct, if produced, may be ducted away from the first catalyst 148 (duct not depicted in the embodiment of FIG. 3). In one or more of these embodiments, the first catalyst 148 (or other gas oxygen reduction unit, discussed below) may be configured to reduce an oxygen content of the stripping gas 114 to less than about three percent (3%) oxygen ($O_2$) by mass, such less than about one percent (1%) oxygen ($O_2$) by mass.

From the first catalyst 148, the stripping gas 114 is provided to the gas inlet 136 of the contactor 128. Simultaneously, liquid fuel 116 is urged by the fuel pump 126 from the fuel source 102 to and through the liquid fuel supply path 106. From the fuel pump 126, the liquid fuel 116 flows through the heat exchanger 152, wherein the liquid fuel 116 may accept heat from the flow of stripping gas 114 through the stripping gas return path 112. From the heat exchanger 152, the liquid fuel 116 flows, still through the liquid fuel supply path 106, to the liquid fuel inlet 138 of the contactor 128. Within the contactor 128, the stripping gas 114 received through the stripping gas inlet 136 is mixed with the flow of liquid fuel 116 received through the liquid fuel inlet 138 to generate a fuel/gas mixture 156. The fuel/gas mixture 156 generated within the contactor 128 is provided to the inlet 146 of the fuel gas separator 130.

Generally, it will be appreciated that during operation of the fuel oxygen reduction unit 104, the liquid fuel 116 provided through the liquid fuel supply path 106 to the contactor 128 may have a relatively high oxygen content. By contrast, the stripping gas 114 provided to the contactor 128 may have a relatively low oxygen content or other specific chemical structure. Within the contactor 128, the liquid fuel 116 is mixed with the stripping gas 114, resulting in the fuel/gas mixture 156. As a result of such mixing a physical exchange may occur whereby at least a portion of the oxygen within the fuel 116 is transferred to the stripping gas 114, such that the fuel component of the mixture 156 has a relatively low oxygen content (as compared to the fuel 116 provided through the liquid fuel supply path 106) and the stripping gas 114 component of the mixture 146 has a relatively high oxygen content (as compared to the stripping gas 114 provided through the stripping gas supply path 108 to the contactor 128).

Figure 4:
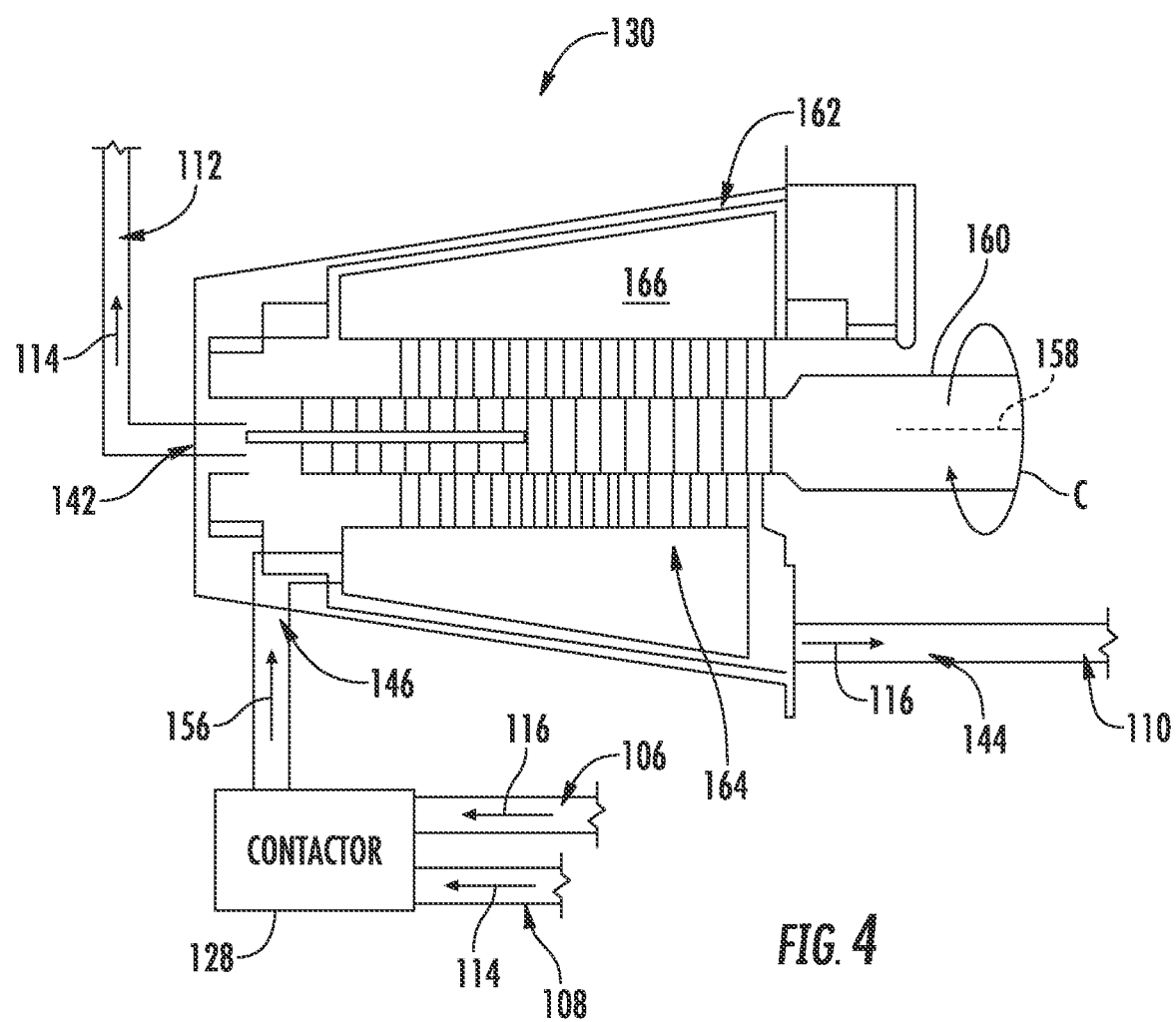
FIG. 4 is a schematic, close-up, cross-sectional view of a fuel gas separator of an exemplary fuel oxygen reduction unit of the fuel delivery system of FIG. 3 in accordance with an exemplary embodiment of the present disclosure.

Referring now also briefly to FIG. 4, providing a close-up, schematic, cross-sectional view of the exemplary fuel gas separator 130 of FIG. 3, it will be appreciated that within the fuel gas separator 130 the stripping gas 114 having a relatively high oxygen content is generally separated from the fuel 116 having a relatively low oxygen content. Specifically, for the embodiment shown, the fuel gas separator 130 defines a central axis 158 and a circumferential direction C extending about the central axis 158. Additionally, the fuel gas separator 130 is configured as a mechanically-driven fuel gas separator 130, or more specifically as a rotary/centrifugal fuel gas separator 130. Accordingly, the fuel gas separator 130 includes an input shaft 160 and a separation assembly 162, the input shaft 160 mechanically coupled to the separation assembly 162, the two components together rotatable about the central axis 158. Further, the input shaft 160 may be mechanically coupled to, and driven by, e.g., a suitable power source 134.

Additionally, the exemplary separation assembly 162 depicted generally includes an inner filter 164 arranged along the central axis 158, and a plurality of paddles 166 positioned radially outward of the inner filter 164. During operation, a rotation of the separation assembly 162 about the central axis 158, and more specifically, a rotation of the plurality of paddles 166 about a central axis 158 (i.e., in the circumferential direction C), may generally force heavier liquid fuel 116 outward and lighter stripping gas 114 inward through the inner filter 164. In such a manner, the liquid fuel 116 may exit through the liquid fuel outlet 144 of the fuel gas separator 130 and the stripping gas 114 may exit through the stripping gas outlet 142 of the fuel gas separator 130, as is indicated.

Accordingly, it will be appreciated that the liquid fuel 116 provided to the liquid fuel outlet 142, having interacted with the stripping gas 114, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 116 provided to the liquid fuel outlet 144 may an oxygen content of less than about five (5) parts per million ("ppm"), such as less than about three (3) ppm, such as less than about two (2) ppm, such as less than about one (1) ppm, such as less than about 0.5 ppm.

Further, it will be appreciated that the exemplary fuel gas separator 130 depicted in FIG. 4 is provided by way of example only. In other embodiments, the separator 130 may have any other suitable configuration for separating liquid fuel 116 from stripping gas 114. For example, in other embodiments, the separator 130 may instead be configured as another form of centrifugal separator, a gravity-assisted separator, or any other passive separator or powered separator, or combination thereof.

Referring now back to the schematic view of the fuel delivery system 100 in FIG. 3, the liquid fuel 116 from the liquid fuel outlet 144 of the separator 130 is provided through the liquid fuel outlet path 110. The liquid fuel outlet path 110 is fluidly coupled to a liquid fuel source line 168, which may provide the relatively low oxygen content fuel to the one or more engines 56 (see, e.g., FIG. 2). As with the embodiment of FIG. 2, the fuel delivery system 100 further includes a return valve 120 and a return line 122. Depending on a fuel demand of the one or more engines 56 (see FIG. 2), at least a portion of the fuel 116 through the liquid fuel outlet path 110 may be returned to the fuel source 102.

As is also depicted in FIG. 3, it will be appreciated that the exemplary fuel oxygen reduction unit 104 returns the stripping gas 114 utilized to the ullage 118 of the fuel source 102.

As noted, the stripping gas 114 to be returned to the ullage 118, i.e., downstream of the separator 130 and through the stripping gas return path 112, may have a relatively high oxygen content. Accordingly, as is also noted above, the fuel oxygen reduction unit 104 further includes the second catalyst 150. The stripping gas 114 from the gas outlet 142 of the separator 130 is provided to the second catalyst 150 wherein an oxygen content of such gas 114 is reduced. The second catalyst 150 is positioned in airflow communication with the stripping gas return path 112 to reduce the oxygen content of stripping gas 114 flowing through the stripping gas return path 112, prior to returning such stripping gas 114 to the ullage 118 of the fuel source 102. It will be appreciated, that in certain exemplary embodiments, the second catalyst 150 may operate in a manner similar to the operations described above with reference to the first catalyst 148. For example, in certain embodiments, the second catalyst 150 may be configured in substantially the same manner as the first catalyst 148, or alternatively, may be configured in any other suitable manner. For example, the second catalyst 150 may react the fuel-vapor rich stripping gas 114 with elements inside the second catalyst 150 to provide a relatively oxygen-free stripping gas 114 upon exit. Inclusion of the second catalyst 150 may ensure the stripping gas 114 returned to the ullage 118 has a desired relatively low oxygen content.

Referring still to the embodiment of FIG. 3, the stripping gas 114 through the stripping gas return path 112 is further cooled downstream of the second catalyst 150 through the heat exchanger 152 (which may be necessary given the presence of the pre-heater 125). For the embodiment shown, the heat exchanger 152 is a gas-to-liquid heat exchanger configured to transfer heat from the stripping gas 114 through the stripping gas return path 112 to a heat exchange fluid, and more specifically, to the liquid fuel 116 flowing through the liquid fuel supply path 106. In such a manner, the heat exchanger 152 may reduce a temperature of the stripping gas 114 through the stripping gas return path 112 and may increase a temperature of the liquid fuel 116 through the liquid fuel supply path 106.

The resulting cooled and relatively low oxygen content stripping gas 114 is then provided through the remainder of the stripping gas flowpath 132, or rather the stripping gas return path 112, back to the ullage 118 of the fuel source 102. In such a manner, the fuel oxygen reduction unit 104 may be configured to simultaneously reduce an oxygen content of a gas within the ullage 118 of the fuel source 102 and reduce an oxygen content of a liquid fuel 116 provided to one or more aircraft engines 52 of a propulsion system 50 of an aircraft 10 including the fuel delivery system 100 (see, e.g., FIGS. 1 and 2). By including a single fuel oxygen reduction system 104 to reduce an oxygen content of fuel to be provided to a plurality of aircraft engines 52, or rather each of the plurality of combustion aircraft engines 52, as well as to reduce an oxygen content of the air within the ullage 118 of the fuel source 102, an overall more efficient fuel delivery system 100 may be provided.

It will be appreciated, however, that in other exemplary embodiments, the fuel delivery system 100 may be configured in any other suitable manner. For example, the fuel delivery system 100 may not provide low oxygen content fuel to each, or even a plurality of aircraft engines. Further, it will be appreciated that for the embodiment shown, the ullage 118 having the oxygen content of its air being reduced is the ullage 118 of the fuel source 102 providing the liquid fuel 116 through the liquid fuel supply path 106 for the fuel oxygen reduction unit 104. However, in other embodiments, the ullage 118 may be of any other suitable fuel source, such that the fuel oxygen reduction unit 104 is operable with more than one fuel source. For example, in certain embodiments, the fuel oxygen reduction unit 104 may be operable with a primary fuel tank and a separate, secondary fuel tank.

Further, for the embodiment shown, the fuel delivery system 100 further includes a second flame arrester 170 in the stripping gas return path 112 immediately upstream of the ullage 118. The second flame arrester 170 may operate in a similar manner to the first flame arrester 154.

Although not depicted, it will be appreciated that in at least certain exemplary embodiments, the fuel oxygen reduction unit 104 may further include a makeup gas source in airflow communication with, e.g., the stripping gas circulation flowpath 132. For example, the makeup gas source may be in ambient air source, a bleed air source, a stripping gas tank, etc., in airflow communication with the flowpath 132 to provide additional air/stripping gas 114 to the circulation gas flowpath if/as needed.

It will be appreciated, however, that in other exemplary embodiments, the fuel delivery system 100 may instead be configured in any other suitable manner. For example, referring now to FIG. 5, a fuel delivery system 100 in accordance with another exemplary embodiment of the present disclosure is provided. The exemplary fuel delivery system 100 of FIG. 5 may be configured in substantially the same manner as the exemplary fuel delivery system 100 of FIG. 3. For example, the fuel delivery system 100 generally includes a fuel source 102 and fuel oxygen reduction unit 104, with the fuel oxygen reduction unit 104 generally defining a liquid fuel supply path 106 and a liquid fuel outlet path 110, as well as a stripping gas supply path 108 and a stripping gas return path 110. The stripping gas supply path 108 and stripping gas return path 110 are each in airflow communication with the fuel source 102, and more specifically, an ullage 118 of the fuel source 102, and the liquid fuel supply path 106 is in fluid communication with the fuel source 102. Further, the exemplary fuel oxygen reduction unit 104 generally includes a contactor 128 and a separator 130. The contactor 128 is configured to receive a stripping gas 114 flow through a stripping gas inlet 136 in airflow communication with the stripping gas supply path 108 and a liquid fuel 116 flow through a liquid fuel inlet 138 in fluid communication with the liquid fuel supply path 106. The contactor 128 is further configured to mix the stripping gas 114 flow with the liquid fuel 116 flow to form a fuel/gas mixture 156 and to provide such fuel/gas mixture 156 to an inlet 146 of the separator 130. The separator 130 is configured to separate the fuel/gas mixture 156 back into the stripping gas 114 flow, which is provided through the stripping gas return path 112 back to the fuel source 102, and the liquid fuel 116 flow, which is provided through the liquid fuel 116 return path to, e.g., one or more aircraft engines 52.

Figure 5:
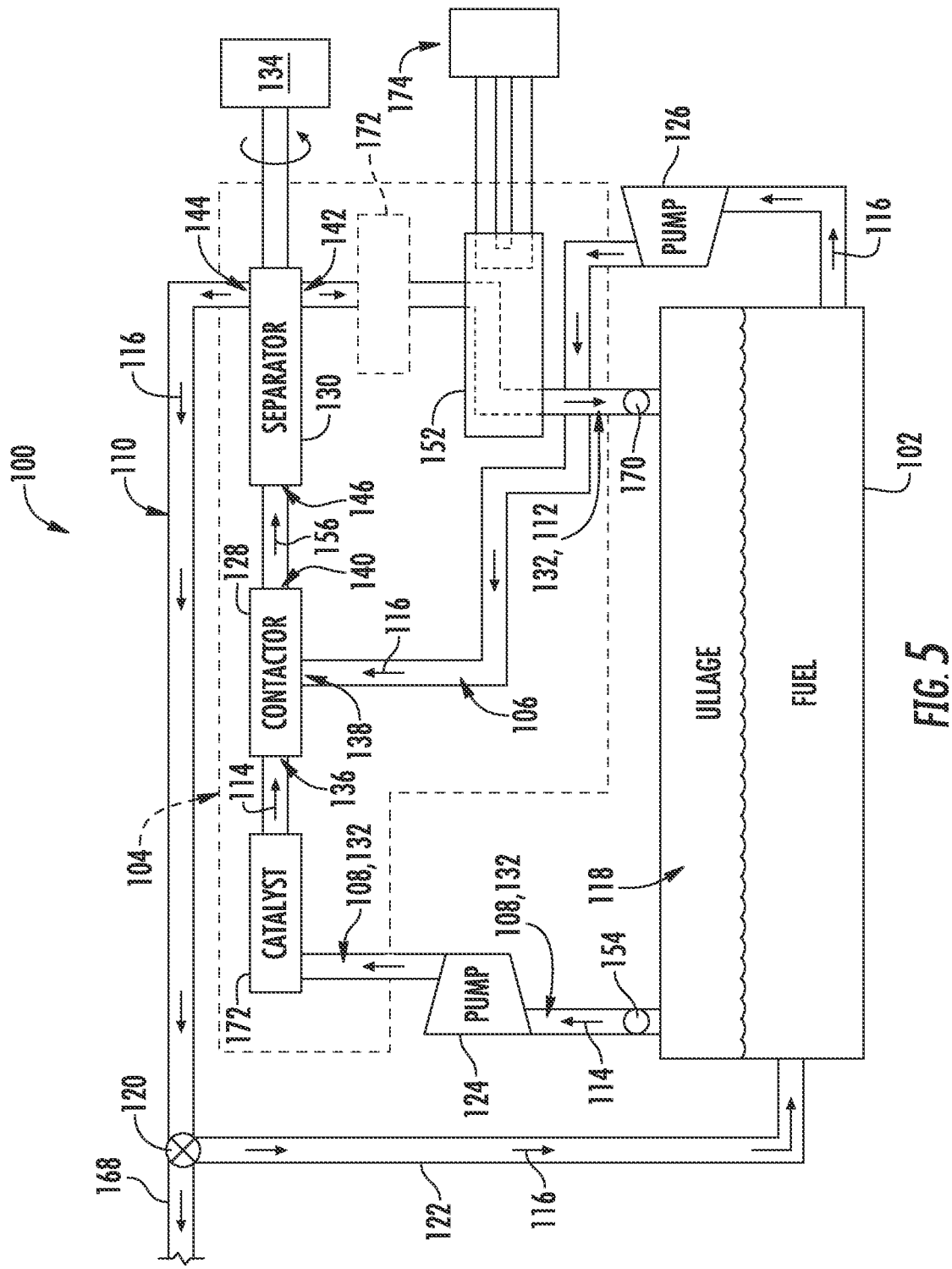
FIG. 5 is a close-up, schematic view of a section of a fuel delivery system in accordance with an exemplary embodiment of the present disclosure.

However, by contrast to the embodiment of FIG. 3, the exemplary fuel delivery system 100 of FIG. 5 may not include both of a first catalyst 148 and a second catalyst 150. Instead, for the exemplary fuel delivery system 100 of FIG. 5, the fuel oxygen reduction unit 104 includes a single catalyst 172 positioned upstream of the contactor 128 and downstream of the ullage 118 of the fuel source 102. In such a manner, the fuel delivery system 100, or rather, the fuel oxygen reduction unit 104 may still reduce an oxygen content of an air within the ullage 118 of the fuel source 102. For example, the catalyst 172 may reduce the oxygen content of the stripping gas 114 flow (received through the stripping gas supply path 108 from the ullage 118) to less than about three percent (3%) oxygen (O2) by mass, such less than about one percent (1%) oxygen (O2) by mass. Although the stripping gas 114 may increase in oxygen content by mixing with the liquid fuel 116 within the contactor 128, prior to being separated back out to the to the stripping gas 114 flow in the separator 130 and returned to the ullage 118 of the fuel tank, the resulting oxygen content of the air within the ullage 118 of the fuel tank may still be less, or substantially less, than it otherwise would be (i.e., an oxygen content of the ullage gas would still be less than an acceptable oxygen level for ullage gas).

Notably, however, as is depicted in phantom, in other embodiments, the single catalyst 172 of the fuel oxygen reduction unit 104 may instead be positioned downstream of the separator 130 and upstream of the ullage 118 of the fuel source 102. With such a configuration, the fuel delivery system 100, or rather, the fuel oxygen reduction unit 104, may still reduce an oxygen content of the air within the ullage 118 of the fuel source 102 and the liquid fuel 116 provided to the one or more aircraft engines 52. For example, with such a configuration, the fuel oxygen reduction unit 104 may maintain an oxygen content of air within the ullage 118 of the fuel source 102 at relatively low level, such that when such air is provided through the stripping gas supply path 108 to the contactor 128 and mixed with liquid fuel 116, it may still be capable of reducing the oxygen content of the fuel to an acceptable or desired level.

Referring still the embodiment of FIG. 5, also by contrast to the embodiment of FIG. 3, the exemplary fuel delivery system 100 includes a heat exchanger 152 downstream of the separator 130 and upstream of the fuel source 102. However, for the embodiment of FIG. 5, the heat exchanger 152 is not in fluid communication with the liquid fuel supply path 106. Instead, the exemplary fuel delivery system 100 includes a separate thermal transfer system 174 and the heat exchanger 152 is thermally coupled to such thermal transfer system 174. The thermal transfer system 174 may be configured to accept heat from the stripping gas 114 through the stripping gas supply path 108 to reduce a temperature of such stripping gas 114. The thermal transfer system 174 may be any suitable thermal transfer system, such as a bypass air system, a lubrication system, etc.

Further, in other embodiments, any other suitable configuration may be provided for the fuel delivery system 100. For example, referring now to FIG. 6, a fuel delivery system 100 in accordance with yet another exemplary embodiment of the present disclosure is provided. The exemplary fuel delivery system 100 of FIG. 6 may be configured in substantially the same manner as the exemplary fuel delivery system 100 of FIG. 3. For example, the fuel delivery system 100 generally includes a fuel source 102 and fuel oxygen reduction unit 104, with the fuel oxygen reduction unit 104 generally defining a liquid fuel supply path 106 and a liquid fuel outlet path 110, as well as a stripping gas supply path 108 and a stripping gas return path 110. The stripping gas supply path 108 and stripping gas return path 110 are each in airflow communication with the fuel source 102, and more specifically, an ullage 118 of the fuel source 102, and further the liquid fuel supply path 106 is in fluid communication with the fuel source 102. Moreover, the exemplary fuel oxygen reduction unit 104 generally includes a contactor 128 and a separator 130.

As with the embodiment of FIG. 3, the fuel delivery system 100 includes a first gas oxygen reduction unit and a second gas oxygen reduction unit. However, by contrast to the embodiment of FIG. 3, for the exemplary fuel delivery system 100 of FIG. 6, the first gas oxygen reduction unit and second gas oxygen reduction unit are not configured as catalysts (i.e., the first catalyst 148 and second catalyst 150), and instead are configured as a first membrane gas oxygen reduction unit 176 and a second membrane gas oxygen reduction unit 178, respectively. The first membrane gas oxygen reduction unit 176 is positioned in the stripping gas supply path 108/stripping gas flowpath 132 downstream (for the embodiment shown) of a boost pump 124 and upstream of a fuel oxygen reduction assembly, or rather upstream of the contactor 128 and separator 130. The second membrane gas oxygen reduction unit 178 is positioned in the stripping gas return path 112/stripping gas flowpath 132 downstream of the fuel oxygen reduction assembly—i.e., the contactor 128 and separator 130 for the embodiment shown—and upstream of the ullage 118 of the fuel source 102.

Each of the first and second membrane gas oxygen reduction units 176, 178 may be configured in any suitable manner for reducing an oxygen content of the stripping gas 114 flowing through the respective portions of the stripping gas flowpath 132. For the embodiments shown, the first and second membrane gas oxygen reduction units 176, 178 each generally define a gas flow chamber 180, through which the stripping gas 114 flows and an oxygen reduction chamber 182, and includes a membrane 184. The oxygen reduction chamber 182 and membrane 184 may have any suitable configuration for extracting oxygen from the stripping gas 114 flowing through the gas flow chamber 180. For example, the oxygen reduction chamber 182 may be a relatively low pressure chamber (e.g., vacuum) and the membrane 184 may be an oxygen permeable membrane allowing for oxygen within the stripping gas 114 within the gas flow chamber 180 to migrate thereacross into the oxygen reduction chamber 182. However, other configurations are contemplated as well, including various other chamber and membrane geometries.

It will be appreciated that with such a configuration, a preheater (such as preheater 125 of FIG. 3) may not be required, such that a heat exchanger (such as heat exchanger 152) may also not be required.

Figure 6:
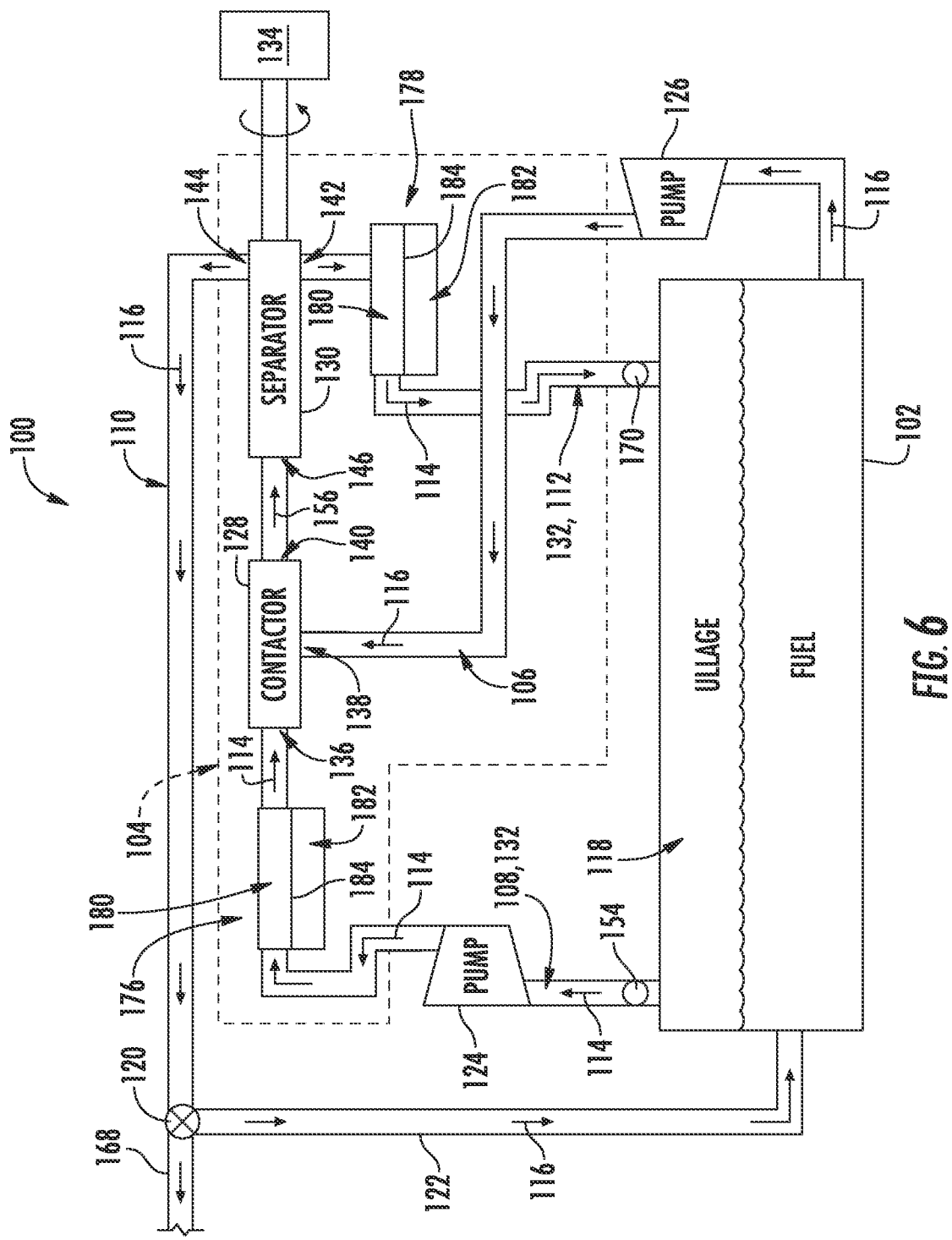
FIG. 6 is a close-up, schematic view of a section of a fuel delivery system in accordance with another exemplary embodiment of the present disclosure.

It will further be appreciated that although the exemplary fuel oxygen reduction unit includes the first and second membrane gas oxygen reduction units 176, 178 as the first and second gas oxygen reduction units, in other embodiments the features of the fuel delivery system 100 of FIG. 6 may be combined with one or more of the features of the exemplary fuel delivery systems 100 of FIGS. 3 through 5. For example, in other embodiments one of the first or second membrane gas oxygen reduction units 176, 178 may instead be configured as a catalyst. Alternatively, in other embodiments, the fuel delivery system 100 may only include one of the first or second membrane gas oxygen reduction units 176, 178 (i.e., a single membrane gas oxygen reduction unit for the fuel oxygen reduction unit 104; see, e.g., embodiments described above with reference to FIG. 5).

Figure 7:
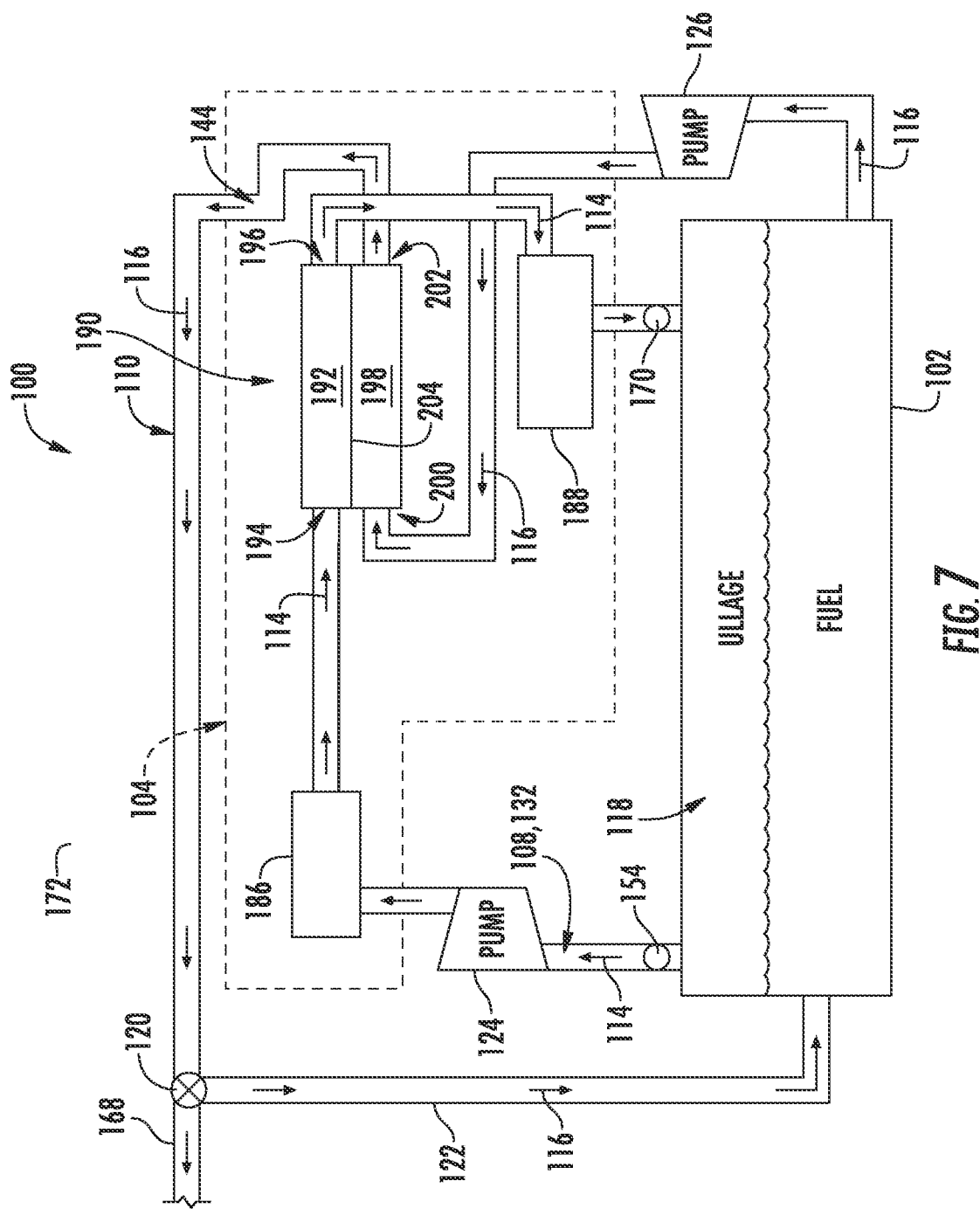
FIG. 7 is a close-up, schematic view of a section of a fuel delivery system in accordance with yet another exemplary embodiment of the present disclosure.

Moreover, it will be appreciated that in still other exemplary embodiments, other configurations are contemplated as well. For example, referring now to FIG. 7, a fuel delivery system 100 in accordance with still another exemplary embodiment of the present disclosure is provided. The exemplary fuel delivery system 100 of FIG. 7 may be configured in substantially the same manner as the exemplary fuel delivery system 100 of FIG. 3. For example, the fuel delivery system 100 generally includes a fuel source 102 and fuel oxygen reduction unit 104, with the fuel oxygen reduction unit 104 generally defining a liquid fuel supply path 106 and a liquid fuel outlet path 110, as well as a stripping gas supply path 108 and a stripping gas return path 110. Further, the fuel oxygen reduction unit 104 includes a first gas oxygen reduction unit 186 and a second gas oxygen reduction unit 188 positioned within the stripping gas supply path 108 and return path 110, respectively, upstream and downstream, respectively, of a fuel oxygen reduction assembly.

However, for the embodiment depicted, the fuel oxygen reduction assembly is not configured as a contactor and a separator, and instead is configured as a membrane fuel oxygen reduction unit 190. The membrane fuel oxygen reduction unit 190 defines a stripping gas chamber 192 defining a gas inlet 194 and a gas outlet 196, as well as a fuel chamber 198, defining a fuel inlet 200 and a fuel outlet 202. The membrane fuel oxygen reduction unit 190 further includes a membrane 204 positioned between the stripping gas chamber 192 and fuel chamber 198. The membrane 204 may be any suitable membrane for allowing the migration of oxygen within the liquid fuel 116 flowing through the fuel chamber 198 to the stripping gas 114 flowing through the stripping gas chamber 192. For example, the membrane 204 may be any suitable oxygen permeable membrane.

Such a configuration may allow for the simultaneous reduction of oxygen within the ullage 118 and the liquid fuel 116 provided to the engines 50, while utilizing less mechanical work.

It will further be appreciated that in still other exemplary embodiments, still other configurations are contemplated. For example, referring now to FIG. 8, a fuel delivery system 100 in accordance with still another exemplary embodiment of the present disclosure is provided. The exemplary fuel delivery system 100 of FIG. 8 may be configured in substantially the same manner as the exemplary fuel delivery system 100 of FIG. 3. For example, the fuel delivery system 100 generally includes a fuel source 102 and fuel oxygen reduction unit 104, with the fuel oxygen reduction unit 104 generally defining a liquid fuel supply path 106 and a liquid fuel outlet path 110, as well as a stripping gas supply path 108 and a stripping gas return path 110. Further, the fuel oxygen reduction unit 104 includes a first gas oxygen reduction unit 186 and a second gas oxygen reduction unit 188 positioned within the stripping gas supply path 108 and return path 110, respectively, upstream and downstream, respectively, of a fuel oxygen reduction assembly.

However, for the embodiment depicted, the flow of gas 114 provided to the stripping gas supply path 108 is not received solely from the ullage 118 of the fuel tank 102, and is additionally or alternatively provided from an air source 200. As is depicted, the air source 200 is separate from the fuel source (i.e., tank 102 for the embodiment shown) and the stripping gas supply path 108 is in airflow communication with the air source 200 for receiving at least a portion of the flow of gas 114 that is provided to the stripping gas supply path 108 from the air source 200.

In at least certain exemplary embodiments, the air source 200 is at least one of an air cycle machine, a gas turbine engine of an aircraft incorporating the fuel delivery system 100, or a device for collecting an ambient airflow. For example, the air source 200 may be a compressor section of a gas turbine engine, such that the airflow provided is a bleed airflow from the compressor section. Additionally, or alternatively, the air source 200 may be an airflow scoop, ram air turbine, or other opening configured to receive a flow of ambient air over the aircraft.

Notably, however, in other embodiments, the air source 200 may be a combination of two or more of the above-mentioned air sources 200, or any other suitable air source(s) 200 external from the fuel supply/fuel tank 102.

Figure 8:
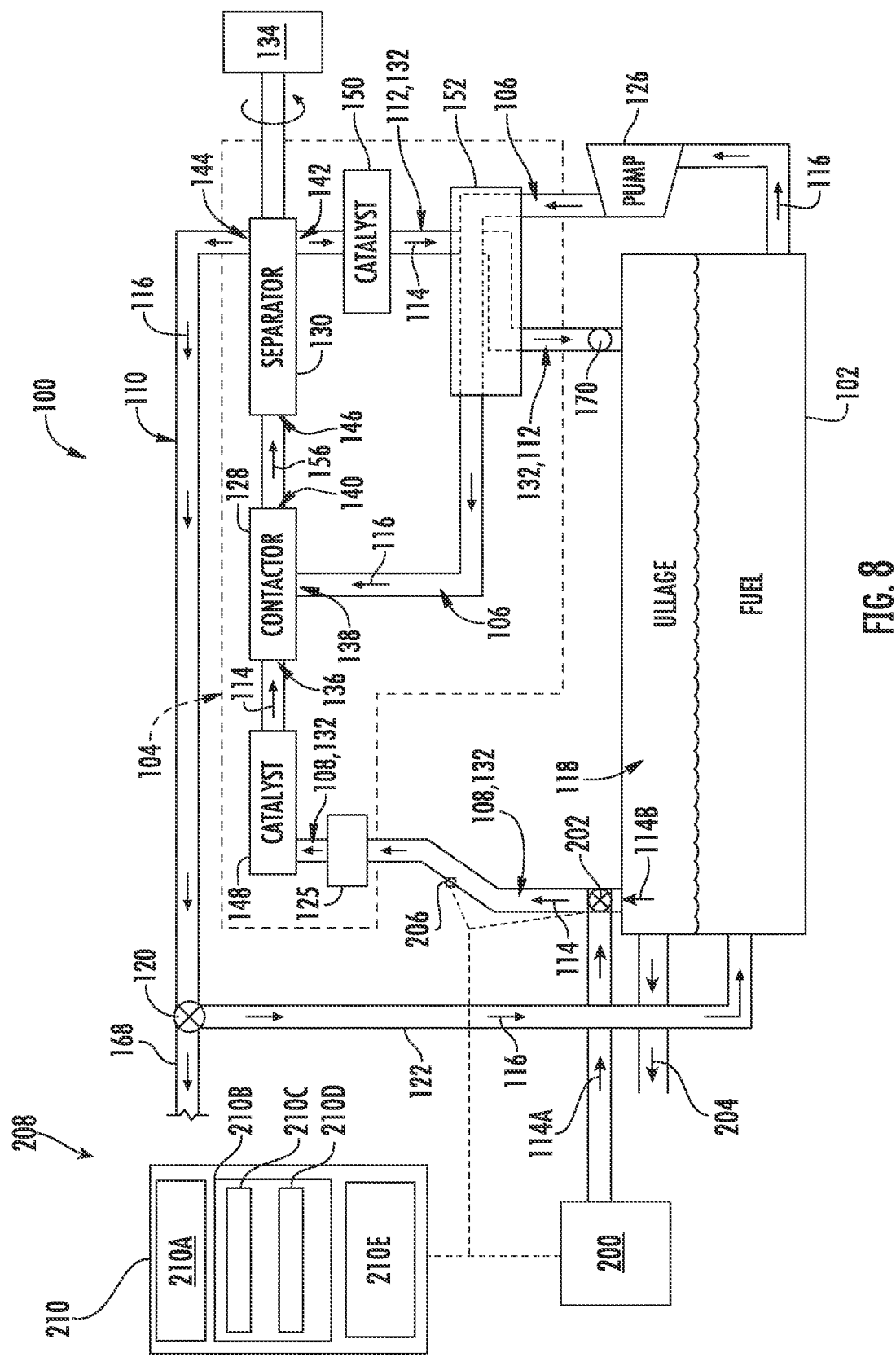
FIG. 8 is a close-up, schematic view of a section of a fuel delivery system in accordance with still another exemplary embodiment of the present disclosure.

In such a manner, it will be appreciated that for the embodiment of FIG. 8, the flow of gas from the air source 200 is a first flow of gas 114A, and the stripping gas supply path is further in airflow communication with the fuel source (or rather the ullage 118 of the fuel tank 102) for receiving a second flow of gas 114B.

It will further be appreciated that for the embodiment depicted, the fuel delivery system 100 further includes a control valve 202 in airflow communication with the stripping gas supply path for controlling a first flowrate of the first flow of gas 114A, a second flowrate of the second flow of gas 114B, or both. More specifically, the stripping gas supply path 108 for the embodiment shown includes a first portion extending from the air source 200, a second portion extending from the fuel source, and a juncture where the first and second portions meet. The control valve 202 is positioned at the juncture for the embodiment shown and is configured as a variable throughput, three-way valve. In certain example embodiments, the control valve 202 may be configured to vary a ratio of the flow of air 114A from the air source 200 to the flow of air 114B from the fuel source between 100:0 and 0:100, and a variety of ratios therebetween (e.g., 10:90, 25:75, 50:50, 75:25, 90:10, etc.).

As such, the control valve 202 may effectively control the amount of air within the stripping gas flowpath 132 that originates from the air source 200 and that originates from the fuel source.

Briefly, it will be appreciated that the exemplary fuel oxygen reduction unit 104 is still configured to provide the flow of gas 114 within the stripping gas return path 112 to the fuel source, or more specifically to the ullage 118 of the fuel tank 102, such that an oxygen content of the gas within the ullage 118 is reduced. However, given the introduction of the airflow from the air source 200, the fuel oxygen reduction unit 104 may generally operate as an at least partially open loop system as it relates to the stripping gas flowpath 108. Thus, the ullage 118 of the fuel tank is configured to provide an excess flow of gas 204 to a location separate from the fuel oxygen reduction unit, and more specifically separate from the stripping gas flowpath 108. For example, in certain exemplary embodiments, the location the excess flow of gas 204 from the ullage 118 of the fuel tank is provided may be an ambient location (e.g., an overboard location), or it may be one or more separate systems of the aircraft (e.g., an aircraft engine, a separate fuel oxygen reduction unit, etc.).

Notably, referring still to FIG. 8, for the embodiment shown, the first flow of gas 114A from the air source 200 may be provided at a first temperature and a first pressure, whereas the second flow of gas 114B from the fuel source may be provided at a second temperature and a second pressure. The first temperature may be greater than the second temperature and/or the first pressure may be greater than the second pressure. For example, when the air source 200 is a compressor section of a gas turbine engine, depending on what stage of the compressor section the first flow of gas 114A is provided from, both the first temperature and the first pressure may be greater than the second temperature and second pressure, respectively. The higher temperature and pressure airflow may facilitate certain operations of the fuel oxygen reduction unit 104, such as a desired stripping gas volumetric flowrate and/or other stripping gas operational parameters (e.g., temperature, pressure, etc.).

It will further be appreciated, however, that a fuel content within the second flow of gas 114B from the fuel source may be greater than a fuel content within the first flow of gas 114A from the air source 200. It will also be appreciated that the fuel oxygen reduction unit 104 may include a gas oxygen reduction unit positioned in the stripping gas flowpath 132 (e.g., within the stripping gas supply path 108 or the stripping gas return path 112). The fuel content of the second flow of gas 114B from the fuel source may assist with the operation of the gas oxygen reduction unit. For example, the gas oxygen reduction unit may be the catalyst 148 or 150, or a burner, and the fuel content within the second flow of gas 114B from the fuel source may assist with the operation the catalyst 148 or 150 or burner.

In such a manner, the fuel delivery system 100 further includes a sensor 206 and a controller 208 operably coupled to the control valve 202 and the sensor 206. The controller 208 is configured to receive data indicative of an operational parameter of the fuel oxygen reduction unit, e.g., from the sensor 206, and vary the first flowrate, the second flowrate, or both in response to the data received indicative of the operational parameter of the fuel oxygen reduction unit.

In certain exemplary embodiments, the operational parameter may be a temperature of the flow of gas 114, a pressure of the flow of gas 114, a flowrate of the flow of gas 114, a volume of the flow of gas 114, etc. Additionally, or alternatively, the operational parameter may be a fuel content in the flow of gas 114. The sensor 206 may be configured to sense the data indicative of one or more of these operational parameters.

Briefly, it will further be appreciated that the controller 208 depicted in FIG. 8 is configured to receive the data sensed from one or more sensors (including sensor 206 for the embodiment shown) and, e.g., may make control decisions for the fuel delivery system 100 based on the received data.

In one or more exemplary embodiments, the controller 208 depicted in FIG. 2 may be a stand-alone controller 208 for the fuel delivery system 100, or alternatively, may be integrated into one or more of a controller for the aircraft with which the fuel delivery system 100 is integrated, a controller for an gas turbine engine receiving fuel from the fuel delivery system 100, etc.

Referring particularly to the operation of the controller 208, in at least certain embodiments, the controller 208 can include one or more computing device(s) 210. The computing device(s) 210 can include one or more processor(s) 210A and one or more memory device(s) 210B. The one or more processor(s) 210A can include any suitable processing device, such as a microprocessor, microcontroller, integrated circuit, logic device, and/or other suitable processing device. The one or more memory device(s) 210B can include one or more computer-readable media, including, but not limited to, non-transitory computer-readable media, RAM, ROM, hard drives, flash drives, and/or other memory devices.

The one or more memory device(s) 210B can store information accessible by the one or more processor(s) 210A, including computer-readable instructions 210C that can be executed by the one or more processor(s) 210A. The instructions 210C can be any set of instructions that when executed by the one or more processor(s) 210A, cause the one or more processor(s) 210A to perform operations. In some embodiments, the instructions 210C can be executed by the one or more processor(s) 210A to cause the one or more processor(s) 210A to perform operations, such as any of the operations and functions for which the controller 208 and/or the computing device(s) 210 are configured, the operations for operating a fuel delivery system 100 (e.g, method 300), as described herein, and/or any other operations or functions of the one or more computing device(s) 210. The instructions 210C can be software written in any suitable programming language or can be implemented in hardware. Additionally, and/or alternatively, the instructions 210C can be executed in logically and/or virtually separate threads on processor(s) 210A. The memory device(s) 210B can further store data 210D that can be accessed by the processor(s) 210A. For example, the data 210D can include data indicative of power flows, data indicative of engine/aircraft operating conditions, and/or any other data and/or information described herein.

The computing device(s) 210 can also include a network interface 210E used to communicate, for example, with the other components of the fuel delivery system 100, the gas turbine engine incorporating fuel delivery system 100, the aircraft incorporating the fuel delivery system 100, etc. For example, in the embodiment depicted, as noted above, fuel delivery system 100 includes one or more sensors for sensing data indicative of one or more parameters fuel delivery system 100. The controller 208 is operably coupled to the one or more sensors through, e.g., the network interface 210E, such that the controller 208 may receive data indicative of various operating parameters sensed by the one or more sensors during operation. Further, for the embodiment shown the controller 208 is operably coupled to, e.g., the control valve 202. In such a manner, the controller 208 may be configured to actuate the control valve 202 in response to, e.g., the data sensed by the one or more sensors.

The network interface 210E can include any suitable components for interfacing with one or more network(s), including for example, transmitters, receivers, ports, controllers, antennas, and/or other suitable components.

Figure 9:
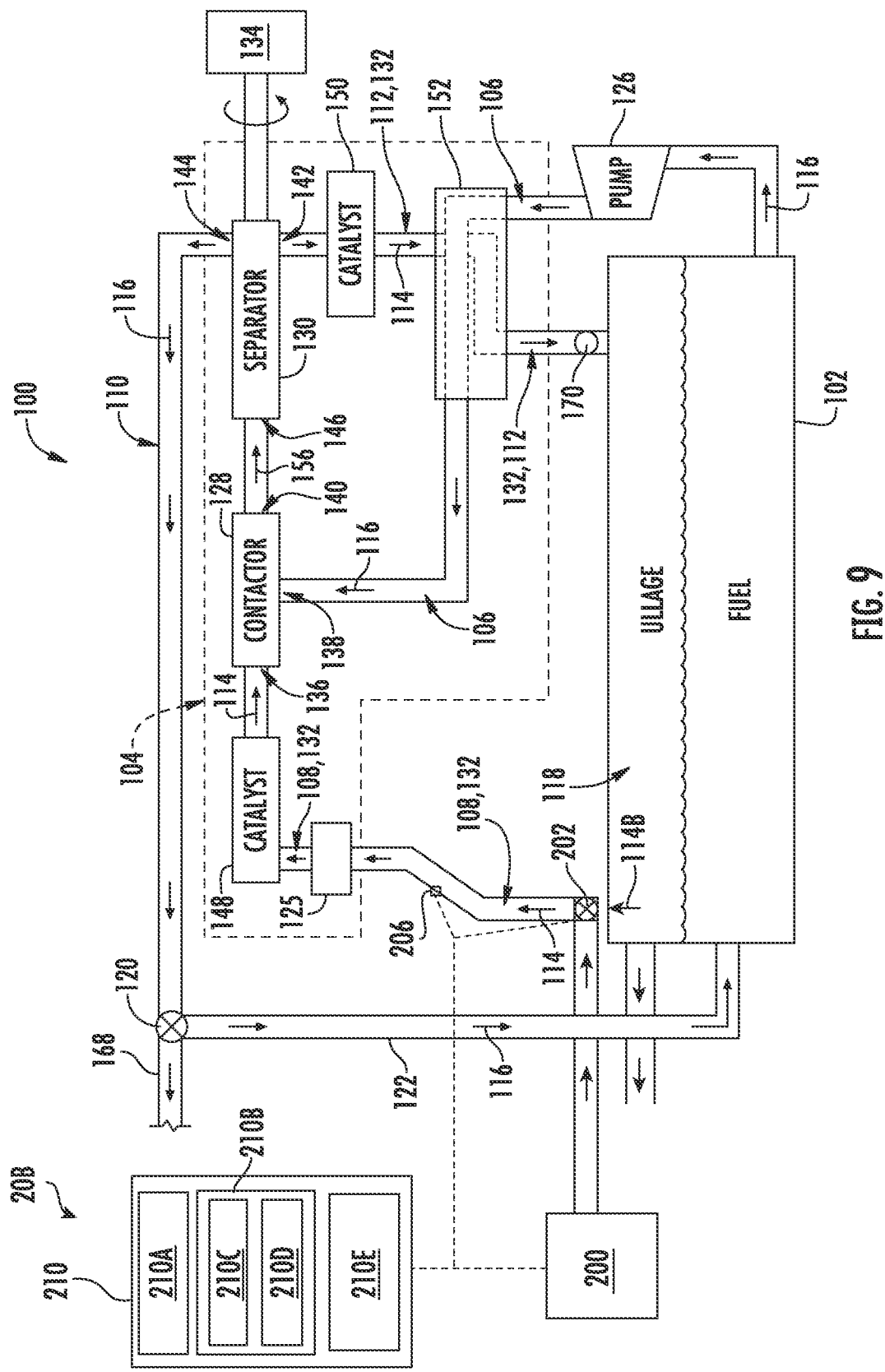
FIG. 9 is a close-up, schematic view of a section of a fuel delivery system in accordance with yet another exemplary embodiment of the present disclosure.

It will further be appreciated that in still other exemplary embodiments, still other configurations are contemplated. For example, referring now to FIG. 9, a fuel delivery system 100 in accordance with still another exemplary embodiment of the present disclosure is provided. The exemplary fuel delivery system 100 of FIG. 9 may be configured in substantially the same manner as the exemplary fuel delivery system 100 of FIG. 8. For example, the fuel delivery system 100 generally includes a fuel source 102, an air source 200, and fuel oxygen reduction unit 104, with the fuel oxygen reduction unit 104 generally defining a liquid fuel supply path 106 and a liquid fuel outlet path 110, as well as a stripping gas supply path 108 and a stripping gas return path 110. Further, the stripping gas supply path 108 is in airflow communication with the air source 200, and the stripping gas return path 112 is in airflow communication with the fuel source.

However, for the embodiment depicted, the flow of gas 114 provided to the stripping gas supply path 108 provided solely from the air source 200, and the stripping gas supply path 108 is not configured to receive an airflow from the fuel source.

Figure 10:
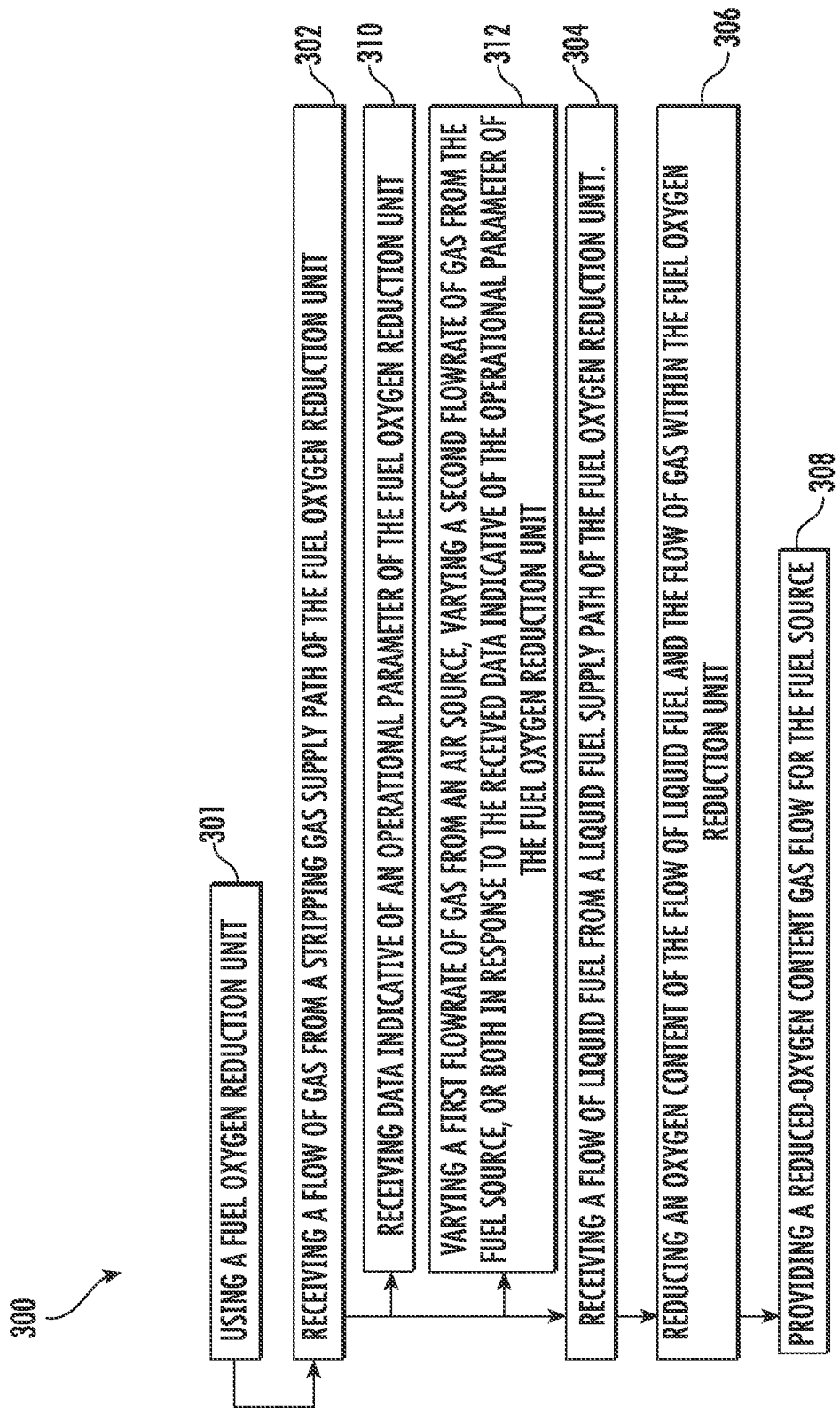
FIG. 10 is a flow diagram of a method for operating a fuel system for an aircraft in accordance with an exemplary aspect of the present disclosure.

Referring now to FIG. 10, a method of operating a fuel system for an aircraft is provided. The fuel system may be configured in accordance with one or more of the exemplary fuel delivery systems discussed above with respect to FIGS. 1 through 9. Accordingly, the fuel system may generally include a fuel source and a fuel oxygen reduction unit.

The method 300 generally includes at (301) using a fuel oxygen reduction unit. For the exemplary aspect shown, using the fuel oxygen reduction unit at (301) includes reducing an oxygen content in liquid fuel from the fuel source. More specifically, for the exemplary aspect shown, using the fuel oxygen reduction unit at (301) includes (302) receiving a flow of gas from a stripping gas supply path of the fuel oxygen reduction unit and at (304) receiving a flow of liquid fuel from a liquid fuel supply path of the fuel oxygen reduction unit. The method 300 further includes at (306) reducing an oxygen content of the flow of liquid fuel and the flow of gas within the fuel oxygen reduction unit, and at (308) providing a reduced-oxygen content gas flow for the fuel source. In certain exemplary embodiments, reducing the oxygen content of the flow of liquid fuel and the flow of gas within the fuel oxygen reduction unit at (306) may include mixing the flow of liquid fuel and the flow of gas together in a contactor to form a fuel/gas mixture, and separating the fuel/gas mixture back out into a flow of liquid fuel and a flow gas. Alternatively, however, reducing the oxygen content of the flow of liquid fuel and the flow of gas within the fuel oxygen reduction unit at (306) may include reducing the oxygen content of the flow of liquid fuel and the flow of gas using an membrane-based fuel oxygen reduction unit.

Referring still to FIG. 10, for the exemplary aspect depicted, receiving the flow of gas from the stripping gas supply path of the fuel oxygen reduction unit at (302) includes at (310) receiving data indicative of an operational parameter of the fuel oxygen reduction unit, and at (312) varying a first flowrate of gas from an air source, varying a second flowrate of gas from the fuel source, or both in response to the received data indicative of the operational parameter of the fuel oxygen reduction unit. In certain exemplary aspects, varying the first flowrate of gas from an air source, varying the second flowrate of gas from the fuel source, or both at (312) may include modulating a control valve, such as the exemplary three-way valve of FIG. 8.

In certain exemplary aspects, the operational parameter of the fuel oxygen reduction unit may be a temperature of the flow of gas to the stripping gas supply path, a pressure of the flow of gas to the stripping gas supply path, a fuel content of the flow of gas to the stripping gas supply path, or a combination thereof.

Such an exemplary aspect may allow the fuel oxygen reduction unit to operate with a desired flowrate, pressure, and/or temperature to provide a desired level of oxygen reduction to the flow of fuel, and fuel source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A fuel system for an aircraft having a fuel source, the system comprising: a fuel oxygen reduction unit defining a liquid fuel supply path, a stripping gas supply path, a liquid fuel outlet path, and a stripping gas return path, wherein the stripping gas return path is configured to be in fluid communication, and optionally in selective fluid communication, with the fuel source of the aircraft.

The fuel system of one or more of these clauses, further comprising: an air source separate from the fuel source, wherein the stripping gas supply path is in airflow communication with the air source for receiving a flow of gas from the air source.

The fuel system of one or more of these clauses, wherein the air source is at least one of an air cycle machine, a gas turbine engine of the aircraft, or a device for collecting an ambient airflow.

The fuel system of one or more of these clauses, wherein the flow of gas from the air source is a first flow of gas, wherein the stripping gas supply path is further in airflow communication with the fuel source for receiving a second flow of gas from the air source.

The fuel system of one or more of these clauses, wherein the stripping gas supply path comprises a first stripping gas flowpath extending from the fuel source, and wherein the fuel system comprises a check valve in the first stripping gas flowpath.

The fuel system of one or more of these clauses, wherein the first flow of gas from the air source is provided at a first temperature and a first pressure, wherein the second flow of gas from the fuel source is provided at a second temperature and a second pressure, and wherein the first temperature is greater than the second temperature, the first pressure is greater than the second pressure, or both.

The fuel system of one or more of these clauses, wherein the fuel oxygen reduction unit comprises: a gas oxygen reduction unit positioned in the stripping gas supply path or the stripping gas return path, and wherein a fuel content within the second flow of gas from the fuel source assists with operation of the gas oxygen reduction unit.

The fuel system of one or more of these clauses, further comprising: a control valve in airflow communication with the stripping gas supply path for controlling a first flowrate of the first flow of gas, a second flowrate of the second flow of gas, or both; and a controller operably coupled to the control valve, the controller configured to receive data indicative of an operational parameter of the fuel oxygen reduction unit and vary the first flowrate, the second flowrate, or both in response to the data received indicative of the operational parameter of the fuel oxygen reduction unit.

The fuel system of one or more of these clauses, wherein the fuel source comprises a fuel tank, wherein the fuel oxygen reduction unit further comprises: an ullage pump in airflow communication with the stripping gas supply path.

The fuel system of one or more of these clauses, wherein the fuel source comprises a fuel tank, and wherein the stripping gas return path is in airflow communication with an ullage of the fuel tank.

The fuel system of one or more of these clauses, wherein the fuel source comprises a fuel tank, and wherein an ullage of the fuel tank is configured to provide an excess flow of gas to a location separate from the fuel oxygen reduction unit.

The fuel system of one or more of these clauses, wherein the liquid fuel supply path is fluidly connected to the fuel source, and wherein the fuel oxygen reduction unit is configured to receive a flow of liquid fuel from the fuel source.

The fuel system of one or more of these clauses, wherein the fuel oxygen reduction unit comprises: a gas oxygen reduction unit positioned in the stripping gas supply path or the stripping gas return path; and a fuel oxygen reduction assembly in fluid communication with the liquid fuel supply path and the liquid fuel return path, and further in airflow communication with the stripping gas supply path and stripping gas return path.

The fuel system of one or more of these clauses, wherein the gas oxygen reduction unit is a first gas oxygen reduction unit positioned in the stripping gas supply path, and wherein the fuel oxygen reduction unit further comprises a second gas oxygen reduction unit in the stripping gas return path.

The fuel system of one or more of these clauses, wherein the fuel oxygen reduction assembly comprises: a contactor fluidly connected to the liquid fuel supply path and the stripping gas supply path for mixing a liquid fuel flow from the liquid fuel supply path with a stripping gas flow from the stripping gas supply path to form a fuel/gas mixture; and a separator fluidly connected to the contactor for receiving the fuel/gas mixture and separating the fuel/gas mixture back into the stripping gas flow and the liquid fuel flow, the separator fluidly connected to the liquid fuel outlet path and the stripping gas return path for providing the liquid fuel flow to the liquid fuel outlet path and the stripping gas flow to the stripping gas return path.

The fuel system of one or more of these clauses, wherein the gas oxygen reduction unit is a membrane gas oxygen reduction unit.

The fuel system of one or more of these clauses, wherein the gas oxygen reduction unit is a catalyst.

The fuel system of one or more of these clauses, incorporated into an aircraft of one or more of these clauses.

The fuel system of one or more of these clauses, incorporated into a method of one or more of these clauses.

A method of operating a fuel system for an aircraft, the fuel system comprising a fuel source and a fuel oxygen reduction unit, the method comprising: receiving a flow of gas from a stripping gas supply path of the fuel oxygen reduction unit; receiving a flow of liquid fuel from a liquid fuel supply path of the fuel oxygen reduction unit; reducing an oxygen content of the flow of liquid fuel and the flow of gas within the fuel oxygen reduction unit; and providing a reduced-oxygen content gas flow for the fuel source.

A method of operating an aircraft fuel system, the aircraft fuel system comprising a fuel source, the method comprising: using a fuel oxygen reduction unit, wherein using the fuel oxygen reduction unit comprises reducing an oxygen content in liquid fuel from the fuel source; and providing a reduced-oxygen content gas flow to the fuel source.

The method of one or more of these clauses, wherein receiving the flow of gas from the stripping gas supply path of the fuel oxygen reduction unit comprises receiving data indicative of an operational parameter of the fuel oxygen reduction unit, and varying a first flowrate of gas from an air source, varying a second flowrate of gas from the fuel source, or both in response to the received data indicative of the operational parameter of the fuel oxygen reduction unit.

The method of one or more of these clauses, wherein the operational parameter of the fuel oxygen reduction unit is a temperature of the flow of gas to the stripping gas supply path, a pressure of the flow of gas to the stripping gas supply path, a fuel content of the flow of gas to the stripping gas supply path, or a combination thereof.

The method of one or more of these clauses, wherein providing the reduced-oxygen content gas flow to the fuel source comprises providing the reduced-oxygen content gas flow to an ullage of the fuel system.

The method of one or more of these clauses, utilizing a fuel system of one or more of these clauses.

The method of one or more of these clauses, utilizing a fuel oxygen reduction unit of one or more of these clauses.

The method of one or more of these clauses, utilizing an aircraft of one or more of these clauses.

An aircraft comprising: a fuel source; and a fuel system, the fuel system comprising a fuel oxygen reduction unit defining a liquid fuel supply path, a stripping gas supply path, a liquid fuel outlet path, and a stripping gas return path, wherein the stripping gas return path is in airflow communication with the fuel source of the aircraft.

The aircraft of one or more of these clauses utilizing a fuel oxygen reduction unit of one or more of these clauses.

A fuel system for an aircraft, the system comprising: a fuel source; and a fuel oxygen reduction unit defining a liquid fuel supply path, a stripping gas supply path, a liquid fuel outlet path, and a stripping gas return path, wherein the stripping gas return path and stripping gas supply path are each in airflow communication with the fuel source.

The fuel system of one or more of these clauses, wherein the fuel source comprises a fuel tank, and wherein the stripping gas supply path and the stripping gas return path are each in airflow communication with an ullage of the fuel tank.

The fuel system of one or more of these clauses, wherein the liquid fuel supply path is fluidly connected to the fuel source, and wherein the fuel oxygen reduction unit is configured to receive a flow of liquid fuel from the fuel source.

The fuel system of one or more of these clauses, wherein the fuel oxygen reduction unit is configured to receive a flow of gas through the stripping gas supply path and a flow of liquid fuel through the liquid fuel supply path, and wherein the fuel oxygen reduction unit is configured to reduce an oxygen content of the flow of gas and the flow of liquid fuel.

The fuel system of one or more of these clauses, wherein the fuel oxygen reduction unit comprises: a gas oxygen reduction unit positioned in the stripping gas supply path or the stripping gas return path; and a fuel oxygen reduction assembly in fluid communication with the liquid fuel supply path and the liquid fuel return path, and further in airflow communication with the stripping gas supply path and stripping gas return path.

The fuel system of one or more of these clauses, wherein the gas oxygen reduction unit is a first gas oxygen reduction unit positioned in the stripping gas supply path, and wherein the fuel oxygen reduction unit further comprises a second gas oxygen reduction unit in the stripping gas return path.

The fuel system of one or more of these clauses, wherein the fuel oxygen reduction assembly comprises: a contactor fluidly connected to the liquid fuel supply path and the stripping gas supply path for mixing a liquid fuel flow from the liquid fuel supply path with a stripping gas flow from the stripping gas supply path to form a fuel/gas mixture; and a separator fluidly connected to the contactor for receiving the fuel/gas mixture and separating the fuel/gas mixture back into the stripping gas flow and the liquid fuel flow, the separator fluidly connected to the liquid fuel outlet path and the stripping gas return path for providing the liquid fuel flow to the liquid fuel outlet path and the stripping gas flow to the stripping gas return path.

The fuel system of one or more of these clauses, wherein the fuel oxygen reduction assembly comprises: a membrane fuel oxygen reduction unit defining a stripping gas chamber in airflow communication with the stripping gas supply path and the stripping gas return path, and a fuel chamber in fluid communication with liquid fuel supply path and the liquid fuel outlet path, the membrane fuel oxygen reduction unit including a membrane separating the stripping gas chamber from the fuel chamber.

The fuel system of one or more of these clauses, wherein the gas oxygen reduction unit is a membrane gas oxygen reduction unit.

The fuel system of one or more of these clauses, wherein the gas oxygen reduction unit is a catalyst.

The fuel system of one or more of these clauses, wherein the fuel oxygen reduction unit further comprises: a pre-heater thermally coupled to the stripping gas supply path; and a heat exchanger thermally coupled to the stripping gas return path.

The fuel system of one or more of these clauses, wherein the fuel oxygen reduction unit further comprises: an ullage pump in airflow communication with the stripping gas supply path.

A propulsion system for an aircraft comprising an aircraft engine; and a fuel system comprising a fuel source; and a fuel oxygen reduction unit defining a liquid fuel supply path, a stripping gas supply path, a liquid fuel outlet path, and a stripping gas return path, wherein the stripping gas return path and stripping gas supply path are each in airflow communication with the fuel source, and wherein the liquid fuel outlet path is in fluid communication with the aircraft engine for providing liquid fuel to the aircraft engine.

The propulsion system of one or more of these clauses, wherein the aircraft engine is a first aircraft engine, and wherein the propulsion system further comprises: a second aircraft engine, wherein the liquid fuel outlet path is in fluid communication with both the first aircraft engine and the second aircraft engine for providing liquid fuel to both the first aircraft engine and the second aircraft engine.

The propulsion system of one or more of these clauses, wherein the fuel oxygen reduction unit comprises: a gas oxygen reduction unit positioned in the stripping gas supply path or the stripping gas return path; and a fuel oxygen reduction assembly in fluid communication with the liquid fuel supply path and the liquid fuel return path, and further in airflow communication with the stripping gas supply path and stripping gas return path.

The propulsion system of one or more of these clauses, wherein the gas oxygen reduction unit is a first gas oxygen reduction unit positioned in the stripping gas supply path, and wherein the fuel oxygen reduction unit further comprises a second gas oxygen reduction unit in the stripping gas return path.

The propulsion system of one or more of these clauses, wherein the fuel oxygen reduction assembly comprises: a contactor fluidly connected to the liquid fuel supply path and the stripping gas supply path for mixing a liquid fuel flow from the liquid fuel supply path with a stripping gas flow from the stripping gas supply path to form a fuel/gas mixture; and a separator fluidly connected to the contactor for receiving the fuel/gas mixture and separating the fuel/gas mixture back into the stripping gas flow and the liquid fuel flow, the separator fluidly connected to the liquid fuel outlet path and the stripping gas return path for providing the liquid fuel flow to the liquid fuel outlet path and the stripping gas flow to the stripping gas return path.

The propulsion system of one or more of these clauses, wherein the fuel oxygen reduction assembly comprises: a membrane fuel oxygen reduction unit defining a stripping gas chamber in airflow communication with the stripping gas supply path and the stripping gas return path, and a fuel chamber in fluid communication with liquid fuel supply path and the liquid fuel outlet path, the membrane fuel oxygen reduction unit including a membrane separating the stripping gas chamber from the fuel chamber.

The propulsion system of one or more of these clauses, wherein the gas oxygen reduction unit is a membrane gas oxygen reduction unit or a catalyst.

The propulsion system of one or more of these clauses, wherein the liquid fuel supply path is fluidly connected to the fuel source for receiving a liquid fuel flow from the fuel source.

The propulsion system of one or more of these clauses utilizing a fuel system of one or more of these clauses, utilizing a fuel oxygen reduction unit of one or more of these clauses, incorporated into an aircraft of one or more of these clauses, or utilized within a method of one or more of these clauses.

What is claimed is:

1. A method of operating an aircraft fuel system, the aircraft fuel system comprising a fuel source, the method comprising:
   using a fuel oxygen reduction unit, the fuel oxygen reduction unit comprising a contactor and a separator, wherein using the fuel oxygen reduction unit comprises:
      receiving a flow of gas from an ullage of the fuel source into a stripping gas supply path of the fuel oxygen reduction unit;
      receiving a flow of a liquid fuel from the fuel source into a liquid fuel supply path of the fuel oxygen reduction unit;
      mixing the flow of gas and the flow of the liquid fuel in the contactor upstream of the separator;
      reducing an oxygen content in the flow of gas from the ullage of the fuel source;
      reducing an oxygen content of the liquid fuel from the fuel source; and
      providing a reduced-oxygen content gas flow back to the fuel source via a stripping gas return path.

2. A fuel system for an aircraft, the fuel system comprising:
   a fuel source for providing a liquid fuel, wherein the fuel source defines an ullage for containing a gas; and
   a fuel oxygen reduction unit, the fuel oxygen reduction unit comprising:
      a contactor;
      a separator;
      a liquid fuel supply path configured to supply a liquid fuel flow to the contactor;
      a stripping gas supply path configured to supply a stripping gas flow from the ullage to the contactor;
      a liquid fuel outlet path configured to return liquid fuel from the separator to the fuel source;
      a stripping gas return path configured to return stripping gas from the separator to the ullage; and
      a gas oxygen reduction unit positioned in the stripping gas supply path or the stripping gas return path,
      wherein the contactor is configured to mix the liquid fuel flow from the liquid fuel supply path with the stripping gas flow from the stripping gas supply path to form a fuel/gas mixture; and
      wherein the separator is fluidly connected to the contactor for receiving the fuel/gas mixture and separating the fuel/gas mixture back into the stripping gas flow and the liquid fuel flow.

3. The fuel system of claim 2, wherein the liquid fuel outlet path is in fluid communication with at least one engine.

4. The fuel system of claim 2, wherein the fuel oxygen reduction unit is configured to reduce an oxygen content of the stripping gas flow and the liquid fuel flow.

5. The fuel system of claim 2, wherein the gas oxygen reduction unit is configured to reduce an oxygen content of stripping gas flowing therethrough to less than three percent (3%) oxygen (O2) by mass.

6. The fuel system of claim 2, further comprising: a flame arrester positioned in the stripping gas supply path upstream of the gas oxygen reduction unit.

7. The fuel system of claim 2, further comprising: a flame arrester positioned in the stripping gas return path upstream of the ullage of the fuel source.

8. The fuel system of claim 2, wherein the gas oxygen reduction unit is a membrane gas oxygen reduction unit.

9. The fuel system of claim 2, wherein the gas oxygen reduction unit is a catalyst.

10. The fuel system of claim 9, wherein the fuel oxygen reduction unit further comprises:
   a pre-heater thermally coupled to the stripping gas supply path; and
   a heat exchanger thermally coupled to the stripping gas return path.

11. The fuel system of claim 2, wherein the fuel oxygen reduction unit further comprises an ullage pump in airflow communication with the stripping gas supply path.

12. The fuel system of claim 2, wherein the ullage of the fuel source is configured to provide an excess flow of gas to a location separate from the fuel oxygen reduction unit.

13. The fuel system of claim 2, further comprising:
   a heat exchanger in fluid communication with the stripping gas return path and a heat exchange fluid,
   wherein the heat exchange fluid is liquid fuel flowing through the liquid fuel supply path.

14. The fuel system of claim 2, further comprising:
   a heat exchanger in fluid communication with the stripping gas return path and a heat exchange fluid,
   wherein the heat exchange fluid is a fluid flowing through a thermal transfer system separate from the fuel oxygen reduction unit.

15. An aircraft comprising:
   a fuel system, the fuel system comprising:
      a fuel source configured to provide a liquid fuel, wherein the fuel source defines an ullage for containing a gas; and
      a fuel oxygen reduction unit, the fuel oxygen reduction unit comprising:
         a contactor;
         a separator;
         a liquid fuel supply path configured to supply a liquid fuel flow to the contactor;
         a stripping gas supply path configured to supply a stripping gas flow from the ullage to the contactor;
         a liquid fuel outlet path configured to return liquid fuel from the separator to the fuel source;
         a stripping gas return path configured to return stripping gas from the separator to the ullage; and
         a gas oxygen reduction unit positioned in the stripping gas supply path or the stripping gas return path,
      wherein the contactor is configured to mix the liquid fuel flow from the liquid fuel supply path with the stripping gas flow from the stripping gas supply path to form a fuel/gas mixture; and
      wherein the separator is fluidly connected to the contactor for receiving the fuel/gas mixture and separating the fuel/gas mixture back into the stripping gas flow and the liquid fuel flow.

16. The aircraft of claim 15, further comprising:
   at least one engine,
   wherein the liquid fuel outlet path is in fluid communication with the at least one engine to provide a reduced-oxygen content flow of liquid fuel to the at least one engine.

* * * * *